United States Patent
Yoshimune et al.

(10) Patent No.: US 11,553,098 B2
(45) Date of Patent: Jan. 10, 2023

(54) IMAGE PROCESSING APPARATUS

(71) Applicant: BROTHER KOGYO KABUSHIKI KAISHA, Nagoya (JP)

(72) Inventors: Hideaki Yoshimune, Nagoya (JP); Tianjin Xie, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/516,346

(22) Filed: Nov. 1, 2021

(65) Prior Publication Data

US 2022/0150373 A1 May 12, 2022

(30) Foreign Application Priority Data

Nov. 5, 2020 (JP) .............................. JP2020-185321

(51) Int. Cl.
*H04N 1/00* (2006.01)

(52) U.S. Cl.
CPC ..... *H04N 1/00602* (2013.01); *H04N 1/00588* (2013.01); *H04N 1/00628* (2013.01); *H04N 1/00689* (2013.01); *H04N 1/00708* (2013.01); *H04N 1/00718* (2013.01); *H04N 1/00795* (2013.01)

(58) Field of Classification Search
CPC ........... H04N 1/00588; H04N 1/00602; H04N 1/00628; H04N 1/00689; H04N 1/00708; H04N 1/00718; H04N 1/00795
USPC ......................................................... 358/498
See application file for complete search history.

(56) References Cited

U.S. PATENT DOCUMENTS

| | | | | |
|---|---|---|---|---|
| 8,773,736 B2 * | 7/2014 | Goto | .................. | H04N 1/00583 270/58.12 |
| 2004/0071486 A1 * | 4/2004 | Manabe | ............... | G03G 15/602 399/367 |
| 2010/0025912 A1 * | 2/2010 | Kotaka | ................ | B65H 3/0684 271/3.15 |
| 2010/0025927 A1 * | 2/2010 | Kotaka | ................ | B65H 3/0684 271/264 |
| 2014/0374984 A1 * | 12/2014 | Morimoto | ................ | B65H 9/04 271/171 |
| 2019/0031457 A1 * | 1/2019 | Kuriki | .................. | B65H 3/0676 |
| 2021/0243317 A1 * | 8/2021 | Ikeda | ................. | H04N 1/00795 |
| 2022/0060590 A1 * | 2/2022 | Hiro | ................... | H04N 1/00716 |
| 2022/0144566 A1 * | 5/2022 | Xie | ........................ | B65H 5/062 |

FOREIGN PATENT DOCUMENTS

JP         2010-037020 A    2/2010

* cited by examiner

*Primary Examiner* — Negussie Worku
(74) *Attorney, Agent, or Firm* — Baker Botts L.L.P.

(57) ABSTRACT

An image processing apparatus includes a motor, a sheet feeding roller, a separation roller, a conveyance roller, a first clutch set provided in a transmission path of a driving force transmitted from the motor to the sheet feeding roller, and a second clutch set provided in a transmission path of a driving force transmitted from the motor to the separation roller. The first clutch set includes a first one-way clutch and a first two-way clutch, and the second clutch set includes a second one-way clutch and a second two-way clutch. A maximum value of a first play angle set between a first transmission portion and a first transmitted portion in the first two-way clutch is larger than a maximum value of a second play angle set between a second transmission portion and a second transmitted portion in the second two-way clutch.

6 Claims, 20 Drawing Sheets

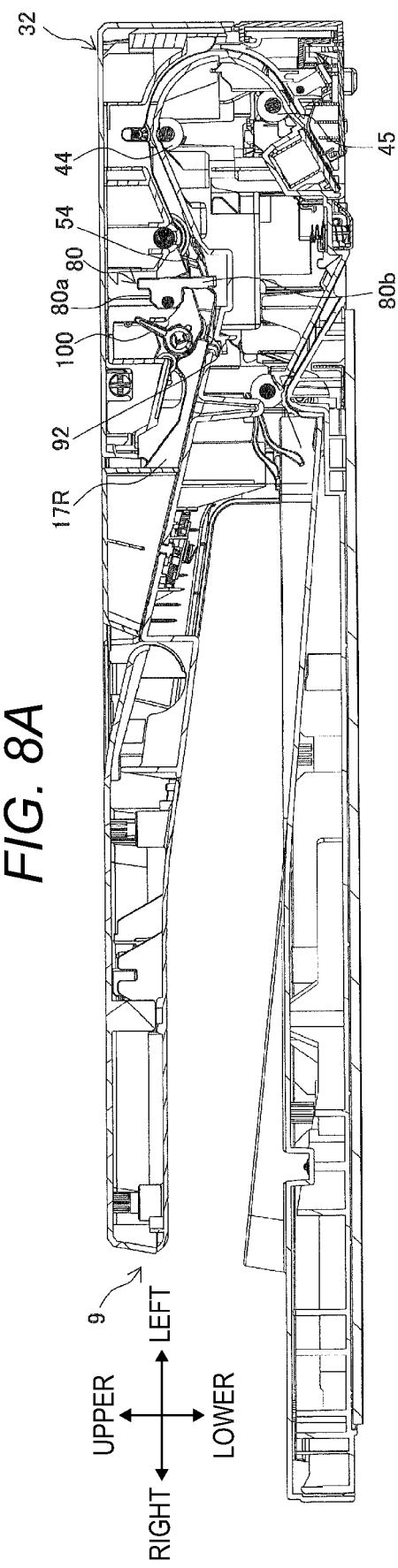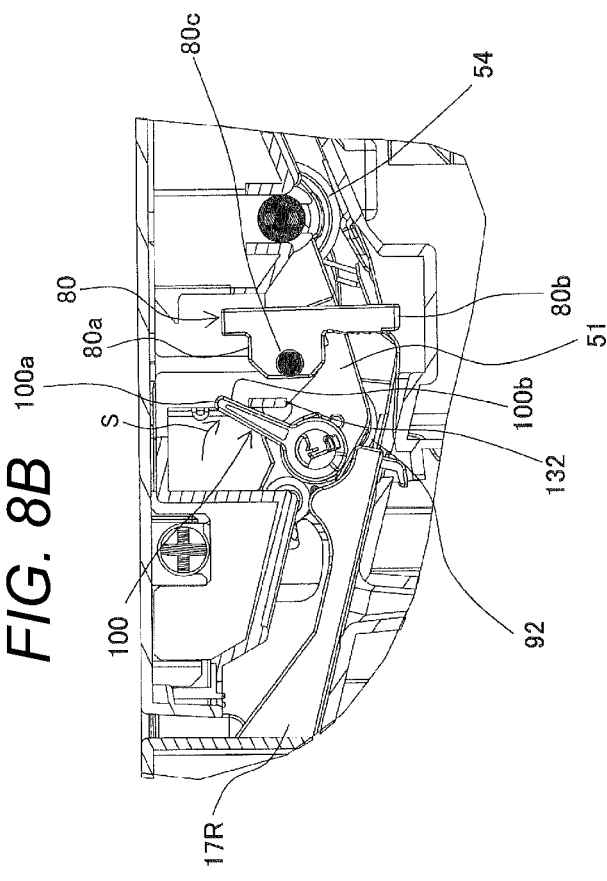

IMAGE PROCESSING APPARATUS

CROSS-REFERENCE TO RELATED APPLICATIONS

This application claims priority from Japanese Patent Application No. 2020-185321 filed on Nov. 5, 2020, the entire contents of which are incorporated herein by reference.

BACKGROUND

There is a related technology in which a first conveyance roller, a second conveyance roller, a sheet feeding roller, and a sheet discharge roller are rotated by driving forces transmitted from a conveyance motor, a sheet feeding motor, and a sheet discharge motor, respectively. Further, in this related technology, the driving force from the conveyance motor is transmitted to the first conveyance roller via a first one-way clutch and is transmitted to the second conveyance roller via a second one-way clutch. Accordingly, the driving force is transmitted to the first delivery roller and the second delivery roller when the conveyance motor is rotated in a forward direction, whereas the driving force is transmitted to neither the first conveyance roller nor the second conveyance roller when the conveyance motor is rotated in a reverse direction.

SUMMARY

One illustrative aspect of the present disclosure provides an image processing apparatus including a motor, a sheet feeding roller, a separation roller, a conveyance roller, a first clutch set, and a second clutch set. The motor is rotatable in a first rotation direction or a second rotation direction opposite to the first rotation direction to generate a driving force corresponding to the respective rotation directions. The sheet feeding roller is configured to be rotated around a first axis by the driving force transmitted from the motor to feed a sheet in a conveying direction. The separation roller is positioned downstream of the sheet feeding roller in the conveying direction and is configured to be rotated around a second axis by the driving force transmitted from the motor to separate the sheet fed from the sheet feeding roller one by one. The conveyance roller is positioned downstream of the separation roller in the conveying direction and is configured to be rotated by the driving force transmitted from the motor to convey the sheet at a conveying speed faster than conveying speeds of the sheet feeding roller and the separation roller. The first clutch set is provided in a transmission path of the driving force transmitted from the motor to the sheet feeding roller. The first clutch set includes: a first one-way clutch configured not to transmit a first driving force transmitted from the motor rotating in the first rotation direction and configured to transmit a second driving force transmitted from the motor rotating in the second rotation direction, and a first two-way clutch connected to the first one-way clutch. The first two-way clutch includes: a first transmission portion configured to be rotated around the first axis by the first driving force or the second driving force, and a first transmitted portion rotatable around the first axis and abuttable against the first transmission portion in a circumferential direction of the first axis, the first transmitted portion being configured to be rotated by the first transmission portion with a delay less than one revolution of the first transmission portion. The second clutch set provided in a transmission path of the driving force transmitted from the motor to the separation roller. The second clutch set includes: a second one-way clutch configured not to transmit the first driving force from the motor and configured to transmit the second driving force from the motor, and a second two-way clutch connected to the second one-way clutch. The second two-way clutch includes: a second transmission portion configured to be rotated around the second axis by the first driving force or the second driving force, and a second transmitted portion rotatable around the second axis and abuttable against the second transmission portion in a circumferential direction of the second axis, the second transmitted portion being configured to be rotated by the second transmission portion with a delay less than one revolution of the second transmission portion. A maximum value of a first play angle set between the first transmission portion and the first transmitted portion in the first two-way clutch is larger than a maximum value of a second play angle set between the second transmission portion and the second transmitted portion in the second two-way clutch.

In the present disclosure, the first clutch set and the second clutch set are provided in the transmission paths of the driving force from the motor to the sheet feeding roller and the separation roller, respectively. The first clutch set includes the first one-way clutch. When the conveying speed of the separation roller on a downstream side is set to be faster than that of the sheet feeding roller on an upstream side and a sheet is conveyed across both the sheet feeding roller and the separation roller, the sheet feeding roller is pulled by a sheet conveyed at a high speed by rotation of the separation roller and is co-rotated. Since the first clutch set includes the first one-way clutch, a force in a direction opposite to the second driving force is not applied to the sheet feeding roller when the sheet feeding roller is co-rotated by the separation roller being rotated by the second driving force from the motor to convey the sheet. Therefore, smooth conveyance can be performed without generating slippage between a roller surface and the sheet. Also, when a roller that conveys a sheet at a higher speed than that of the separation roller is provided on a downstream side of the separation roller, since the second clutch set includes the second one-way clutch, smooth conveyance can be performed during co-rotation of the separation roller, as described above.

When the plurality of sheets are fed from the upstream side of the sheet feeding roller, while the preceding sheet is being conveyed across the conveyance roller, the separation roller, and the sheet feeding roller, the conveying speed of the conveyance roller is faster than those of the sheet feeding roller and the separation roller. Accordingly, the sheet feeding roller and the separation roller are in a co-rotation state due to the conveying speed of the conveyance roller. In this co-rotation state, in the first two-way clutch provided in the first clutch set and the second two-way clutch provided in the second clutch set, a first play angle generated between the first transmission portion and the first transmitted portion and a second play angle generated between the second transmission portion and the second transmitted portion are increased because of a speed difference from the conveyance roller.

Thereafter, when a rear end of the preceding sheet passes through the sheet feeding roller, the co-rotation of the sheet feeding roller ends and rotation is stopped. As a result, a play angle between the first transmission portion to which the second driving force from the motor is input and the first transmitted portion facing the first transmission portion in a circumferential direction is rapidly decreased. When the decreased play angle becomes zero, the first transmission portion and the first transmitted portion abut against each other and the second driving force is transmitted to the sheet feeding roller, and the sheet feeding roller starts conveying the exposed succeeding sheet after the rear end of the preceding sheet has passed through the sheet feeding roller.

Due to such behavior, for example, in a case where the play angle in the first two-way clutch related to the sheet feeding roller and the play angle in the second two-way clutch related to the separation roller are set to substantially the same value, conveyance of the succeeding sheet to a separation roller side by the sheet feeding roller may be started in a state where the rear end of the preceding sheet has not yet passed through the separation roller. In this way, when a conveying start timing of the sheet feeding roller becomes relatively early, an interval between the preceding sheet and the succeeding sheet cannot be sufficiently made, and multi-feed may occur. Further, when a nip load from the separation roller is applied in a state where the succeeding sheet fed by the sheet feeding roller overlaps a vicinity of the rear end of the preceding sheet, a wrinkle may occur at a distal end of the succeeding sheet.

Therefore, in the present disclosure, the maximum value of the first play angle set in the first two-way clutch of the first clutch set that transmits the driving force to the sheet feeding roller is made larger than the maximum value of the second play angle set in the second two-way clutch of the second clutch set that transmits the driving force to the separation roller. Accordingly, as compared with a case where at least the two play angles are set to substantially the same value as described above, it is possible to delay a conveying start timing of the succeeding sheet by the sheet feeding roller. As a result, it is possible to reduce occurrence of a conveyance abnormality such as occurrence of the multi-feed due to a shortage of the interval between the preceding sheet and the succeeding sheet as described above or occurrence of the wrinkle due to the nip load of the separation roller.

BRIEF DESCRIPTION OF THE DRAWINGS

Illustrative embodiments of the disclosure will be described in detail based on the following figures, wherein:

FIG. 8A is a cross-sectional view showing a state where the engagement between the stopper and the lock lever is released, and FIG. 8B is a partially enlarged view thereof;

DETAILED DESCRIPTION

In the related technology, when the sheet is conveyed along a conveyance path, a sheet conveying speed of the conveyance roller disposed downstream of the separation roller may be set to be faster than sheet conveying speeds of the sheet feeding roller and the separation roller. In this case, smooth conveyance can be performed by providing the sheet feeding roller and the separation roller with the one-way clutch. However, when a succeeding sheet is conveyed by the sheet feeding roller after a rear end of a sheet conveyed by the conveyance roller has passed through the sheet feeding roller, a conveyance abnormality such as a wrinkle or multi-feed may occur.

Therefore, illustrative aspects of the present disclosure provide an image processing apparatus that can reduce a conveyance abnormality when sheets are continuously fed.

Hereinafter, an embodiment of the present disclosure will be described with reference to the drawings. Each drawing is used for explaining technical characteristics that can be adopted in the present disclosure, and the configuration and the like of the apparatus described are not intended to be limited thereto, but are merely explanatory examples.

Overall Schematic Configuration of Multifunction Device

Figure 1:
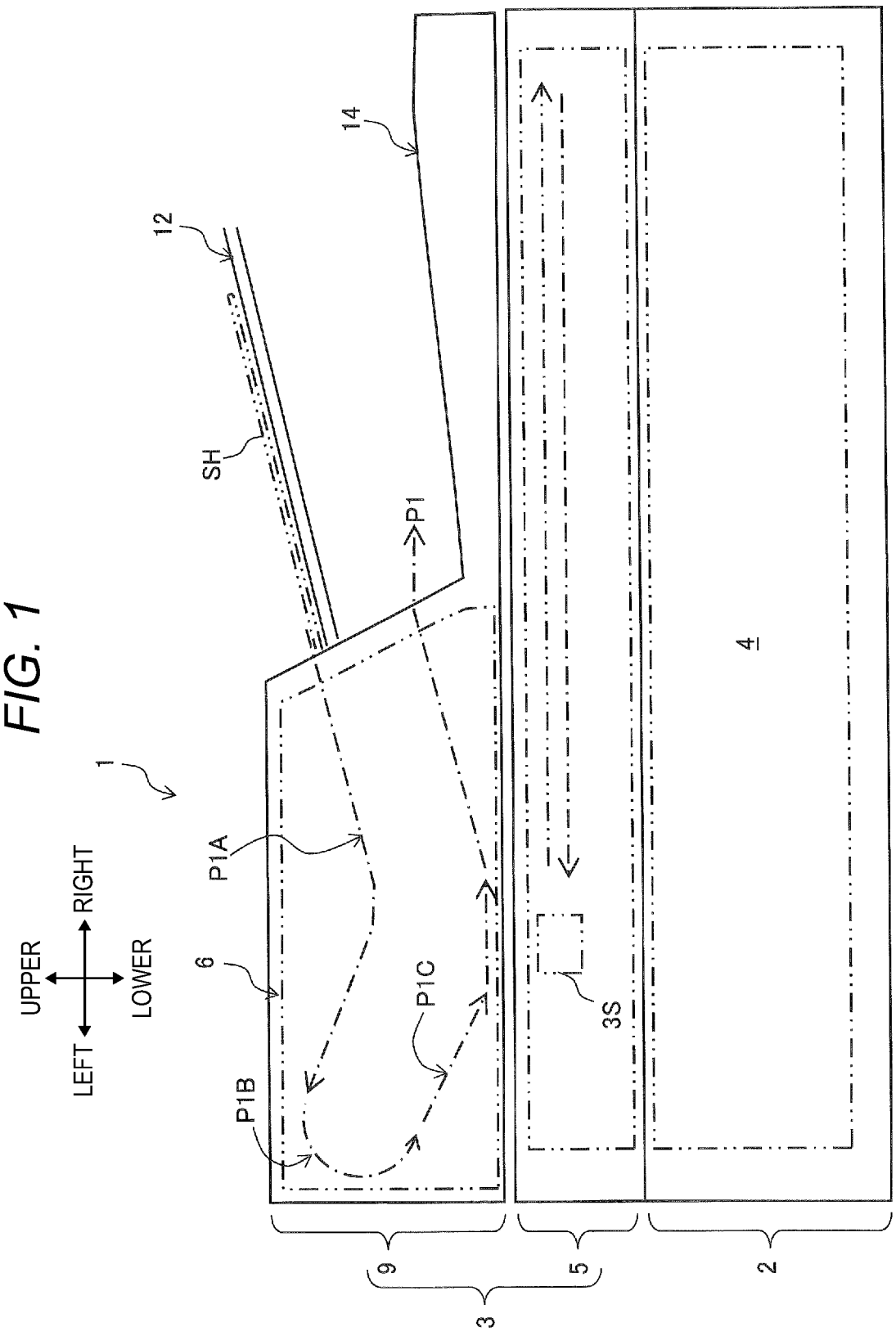
FIG. 1 is a schematic diagram showing a conceptual overall configuration of a multifunction device according to an embodiment of the present disclosure.

FIG. 1 conceptually shows an overall schematic configuration of a multifunction device 1 according to the present embodiment. The multifunction device 1 is an example of an image processing apparatus. In the multifunction device 1 shown in FIG. 1, a front side of a drawing sheet is defined as a front side of the apparatus, a left side of the drawing sheet is defined as a left side, and front and rear directions, left and right directions, and upper and lower directions are displayed. Then, directions shown in the following drawings are all displayed in correspondence with directions shown in FIG. 1.

As shown in FIG. 1, the multifunction device 1 includes a main body unit 2 and a reader 3. The reader 3 includes an automatic document feeder 9 (hereinafter, referred to as an ADF 9) and a flat-bed unit 5 (hereinafter, referred to as an FB unit 5). An operation panel 40 (see FIG. 16 described later), which is a touch panel or the like, is provided on a front surface of the FB unit 5 of the ADF 9.

As shown in FIG. 1, the main body unit 2 is a flat, substantially box-shaped body, and includes an image forming unit 4 therein. The image forming unit 4 forms an image on a recording sheet by an inkjet method, a laser method, or the like based on image data received from a personal computer connected to the multifunction device 1, image data generated by reading an image of a document by the reader 3, or the like. The reader 3 is disposed above the main body unit 2. The FB unit 5 is used when reading an image of a document placed on a document support surface 101A, which will be described later. The ADF 9 includes a supply tray 12, a discharge tray 14, and a conveyance unit 6. The conveyance unit 6 conveys sheets SH placed on the supply tray 12 along a conveyance path P1 and discharges the sheets SH to the discharge tray 14. The ADF 9 is used to read images of the sheets SH placed on the supply tray 12 while sequentially conveying the images along the conveyance path P1. The sheet to be read includes a sheet such as paper or an OHP sheet, a document, and the like.

Appearance of ADF

Figure 2:
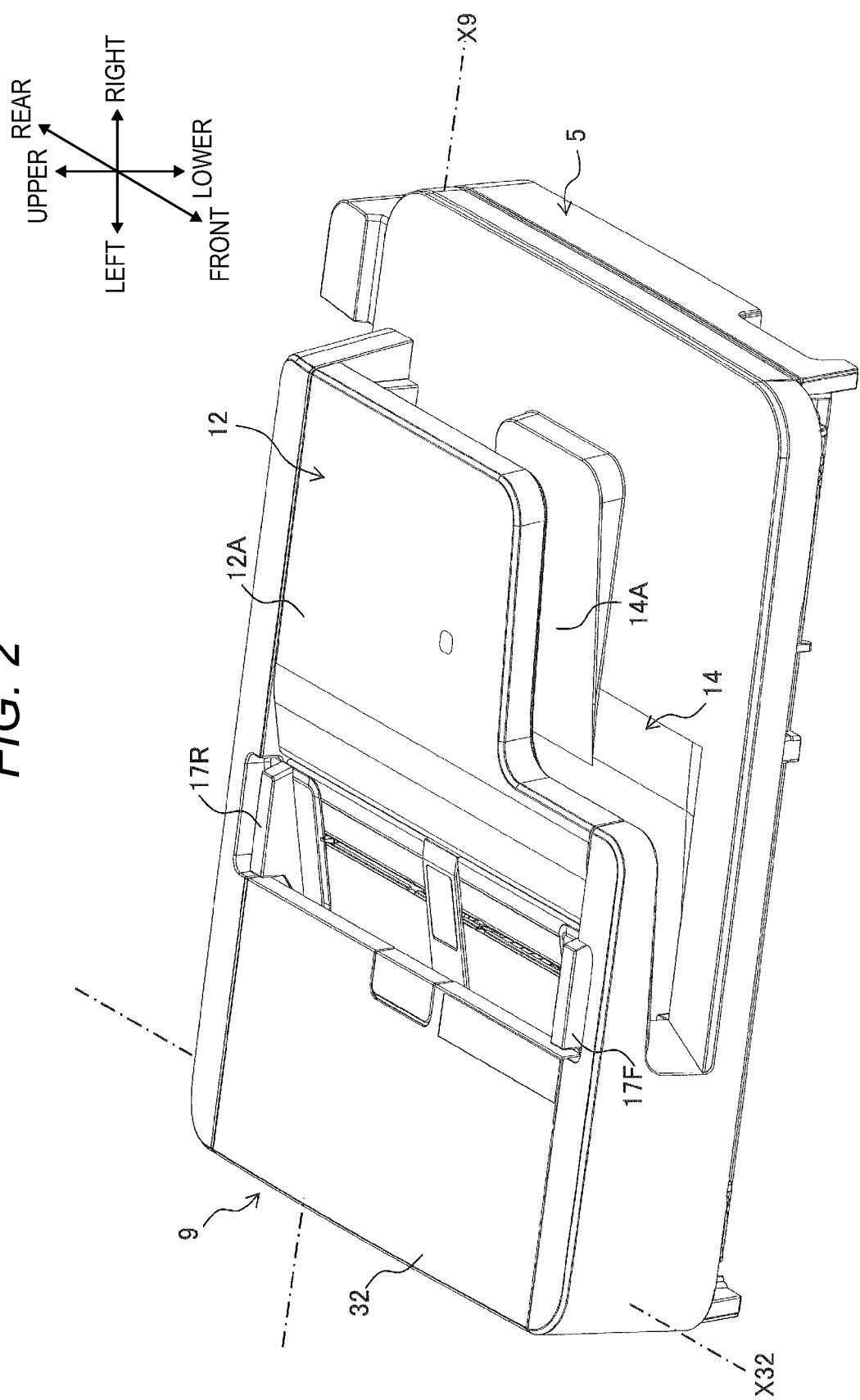
FIG. 2 is a perspective view showing an appearance configuration of the multifunction device.
Figure 3:
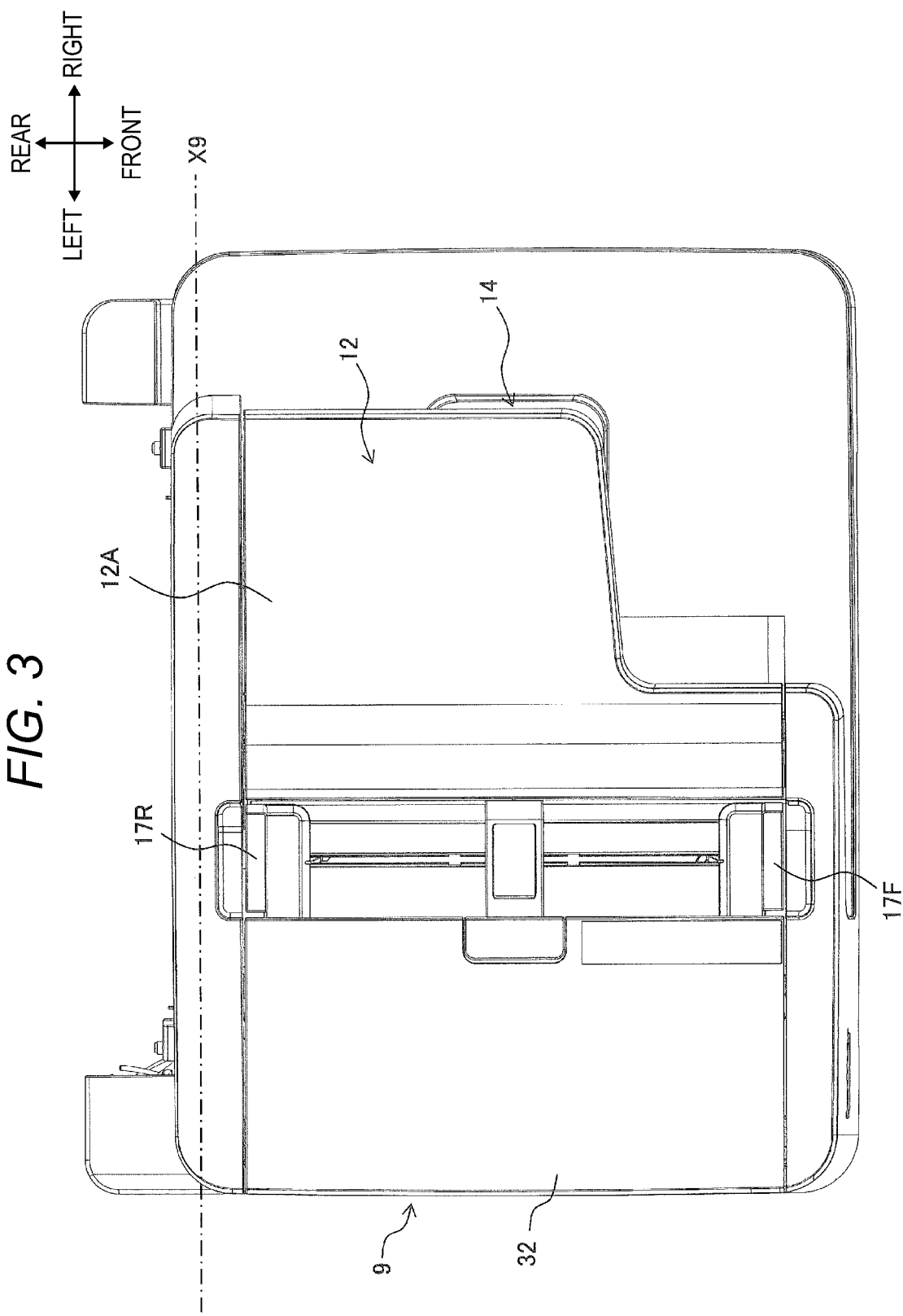
FIG. 3 is a plan view showing the appearance configuration of the multifunction device.

An appearance configuration of the ADF 9 is shown in FIGS. 2 and 3. As shown in FIGS. 2 and 3, the ADF 9 is swingably supported around an opening and closing axis X9 that extends in a left-right direction by a hinge (not shown) disposed at a rear portion. The ADF 9 covers the document support surface 101A, which will be described later, from above in a closed state shown in FIGS. 2 and 3. Although not shown, the ADF 9 exposes the document support surface 101A by being swung around the opening and closing axis X9 such that a front end portion thereof is displaced upward and rearward. Accordingly, a user can cause a document to be read to be supported on the document support surface 101A.

As shown in FIGS. 2 and 3, the supply tray 12 is formed at a right portion of the ADF 9. An upper surface of the supply tray 12 is a sheet feeding surface 12A that supports the sheets SH from below. A plurality of sheets SH to be read, which are conveyed by the conveyance unit 6, are loaded on the sheet feeding surface 12A. The sheet feeding surface 12A is a flat surface inclined downward to a left side. A front guide 17F and a rear guide 17R are provided on the supply tray 12 so as to be slidable in a front-rear direction. When the front guide 17F and the rear guide 17R approach or separate from each other, a plurality of types of sheets SH having different sizes supported by the supply tray 12 are sandwiched from front and rear sides. As shown in FIGS. 2 and 3, the discharge tray 14 is positioned below the supply tray 12. An upper surface of the discharge tray 14 is a sheet discharge surface 14A that supports the sheets SH from below. An image sensor 3S reads an image on the sheet discharge surface 14A, and the sheets SH discharged by the conveyance unit 6 are loaded on the sheet discharge surface 14A. The sheet discharge surface 14A is a flat surface inclined upward from left to right.

As shown in FIGS. 2 and 3, an opening and closing cover 32 is provided at an upper portion of the ADF 9. The opening and closing cover 32 is a substantially flat plate member that extends in front-rear and left-right directions from a substantially center to a left end of the ADF 9. A left end portion of the opening and closing cover 32 is bent downward. Then, the opening and closing cover 32 is swingably supported around an opening and closing axis X32 that extends in the front-rear direction at a left end and a lower end portion thereof. Accordingly, the opening and closing cover 32 is displaceable between a closed position indicated by solid lines in FIGS. 2 and 3 and an open position indicated in FIG. 5 and the like described later. In the closed position, the opening and closing cover 32 functions to cover the conveyance path P1.

Cross-Sectional Structure of Reader

Figure 4:
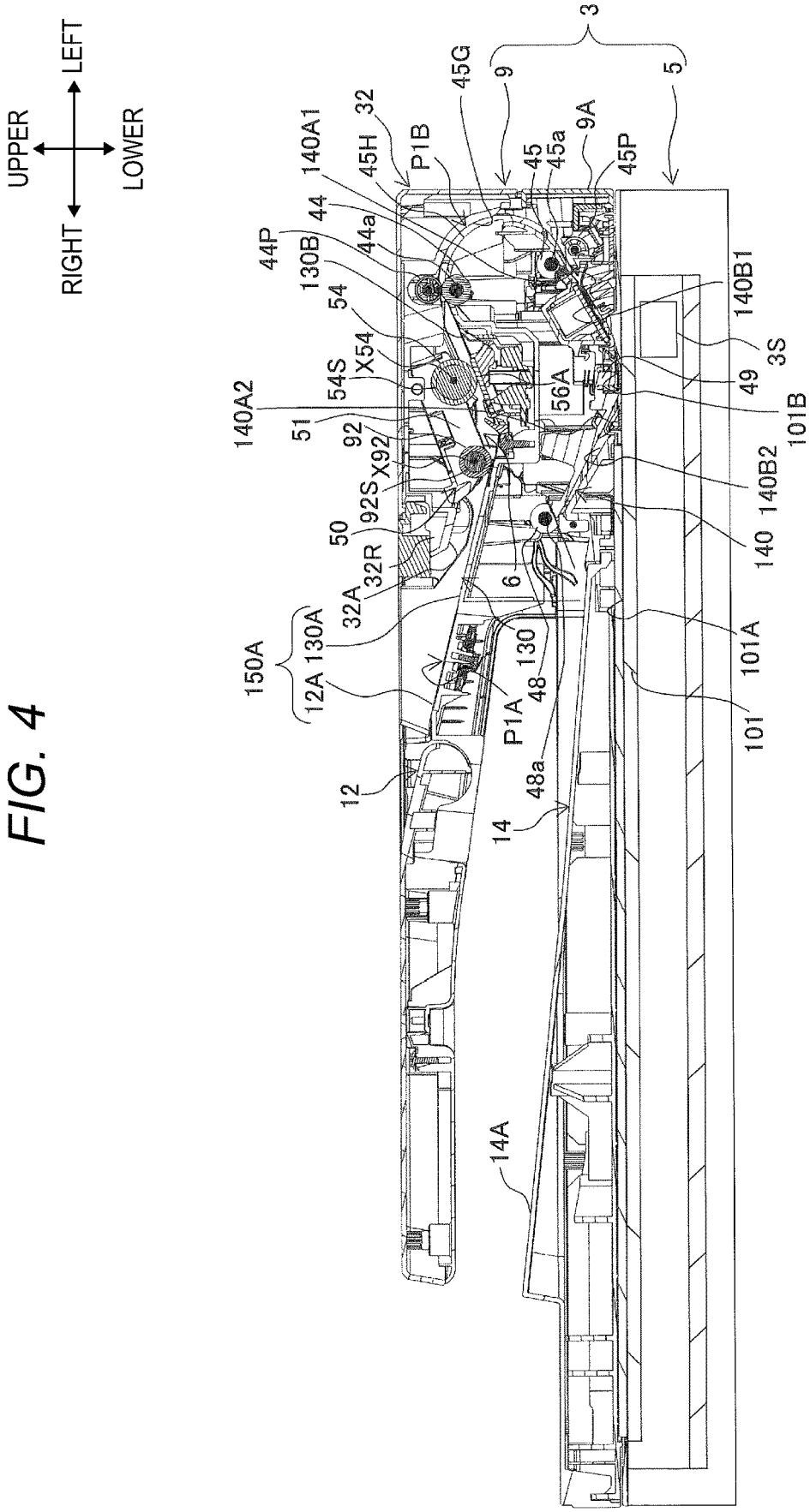
FIG. 4 is a transverse cross-sectional view of a cross-sectional structure of a main part of a reader when viewed from a rear side.
Figure 5:
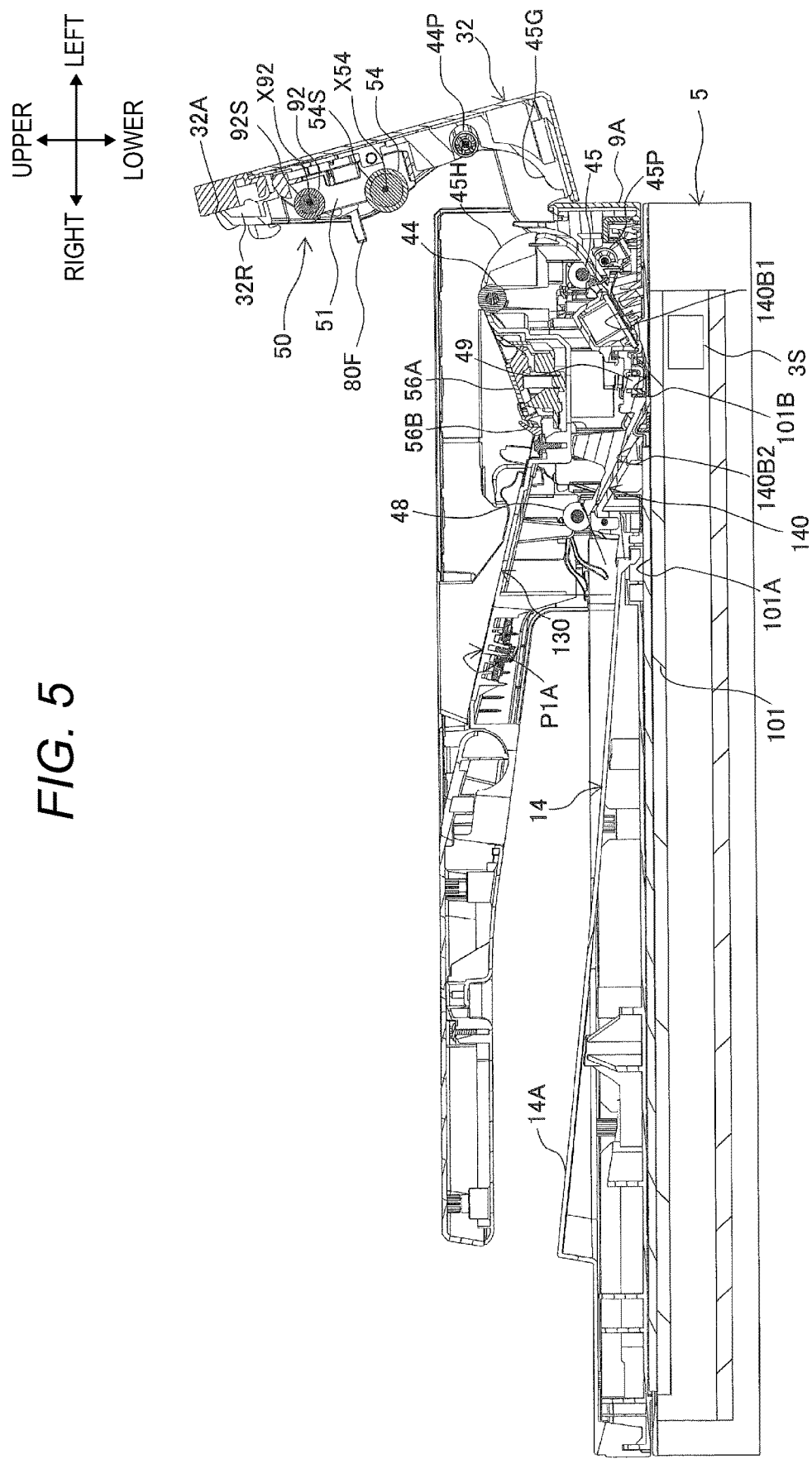
FIG. 5 is a transverse cross-sectional view showing a state where an opening and closing cover is opened in the structure shown in FIG. 4.

FIG. 4 is a diagram showing a cross-sectional structure of a main part of the reader 3 when viewed from a rear side. FIG. 5 is a diagram showing a state where the opening and closing cover 32 is opened in the cross-sectional structure. In these FIGS. 4 and 5, a platen glass 101 is disposed on an upper surface of the FB unit 5. An upper surface of the platen glass 101 forms the document support surface 101A. The image sensor 3S is provided below the platen glass 101 in the FB unit 5 so as to be movable in the left-right direction. The document support surface 101A supports the document from below when the image sensor 3S reads an image of the document in a static state.

A reading surface 101B is formed by an upper surface of the platen glass 101. The reading surface 101B guides the conveyed sheets SH from below when the image sensor 3S in the FB unit 5 reads images on the sheets SH conveyed one by one by the conveyance unit 6. In the present embodiment, an object from which an image is read using the document support surface 101A is referred to as the document, and an object from which an image is read while being conveyed by the conveyance unit 6 is referred to as the sheet SH. The document and the sheet SH may be substantially the same.

The FB unit 5 reads the sheets SH or the documents to generate image data based on images of the sheets SH or the documents. The FB unit 5 includes the image sensor 3S, a scanning mechanism (not shown), and the platen glass 101. The scanning mechanism reciprocates the image sensor 3S in the left-right direction below the document support surface 101A and the reading surface 101B. When reading an image of a document supported by the document support surface 101A, the image sensor 3S reads the image while moving below the document support surface 101A. When an image is read while the sheet SH is conveyed by the conveyance unit 6, the image sensor 3S is stopped at a predetermined static reading position. Here, the static reading position where the image sensor 3S is stopped is a position facing the reading surface 101B from below. As the image sensor 3S, a known image reading sensor such as a contact image sensor (CIS) or a charge coupled device (CCD) is used. The image sensor 3S is an example of an image reader.

A base member 9A is provided at a lower portion of the ADF 9. The base member 9A constitutes a bottom portion of the ADF 9. A right portion of the base member 9A constitutes the discharge tray 14. The conveyance unit 6 is provided between the opening and closing cover 32 and a left portion of the base member 9A of the ADF 9. The conveyance unit 6 includes an upper chute member 130 and a lower chute member 140 assembled to the base member 9A. The lower chute member 140 is positioned below the upper chute member 130. The base member 9A is positioned below the lower chute member 140.

Figure 6:
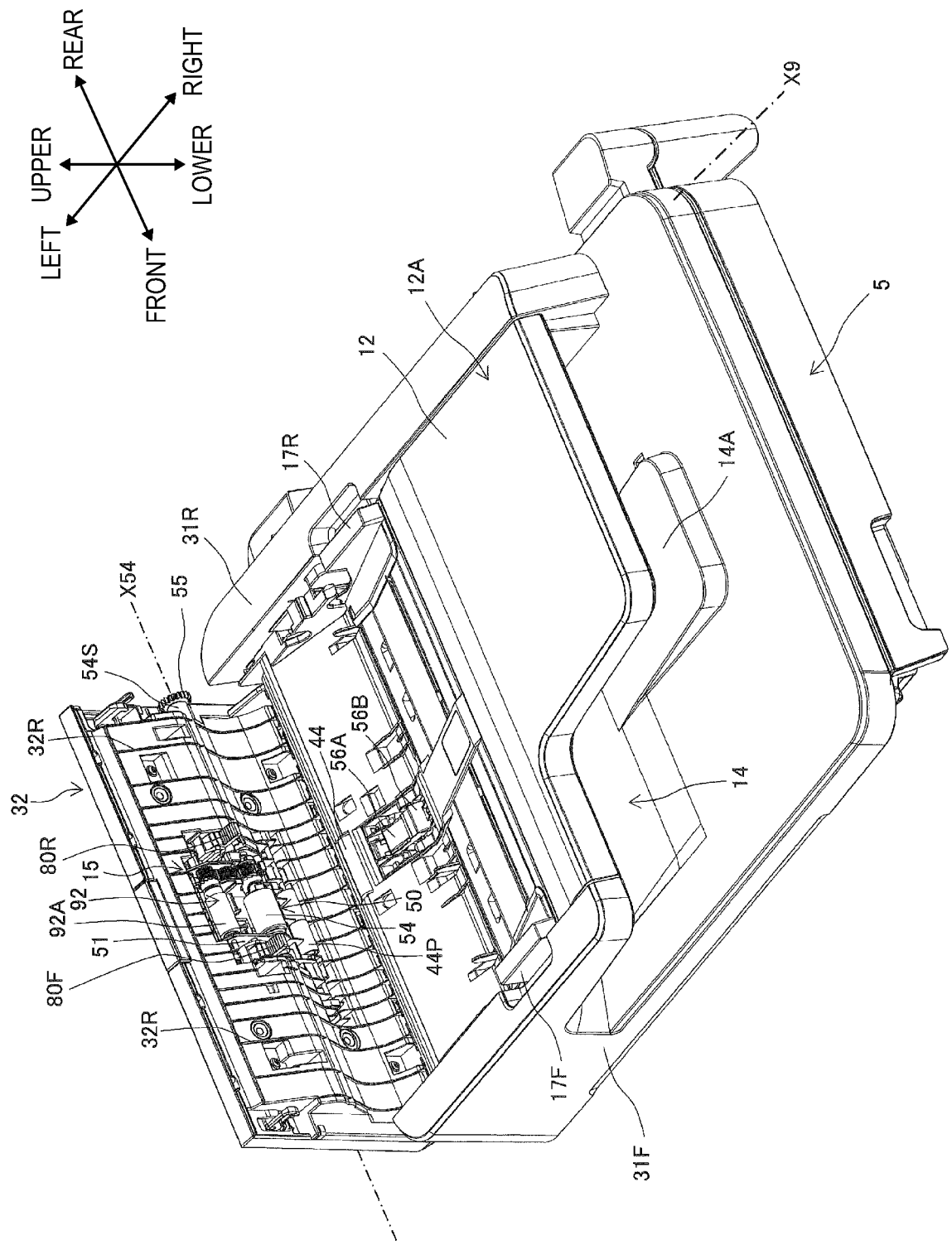
FIG. 6 is a perspective view showing a state where the opening and closing cover is opened in the structure shown in FIG. 4.

As shown in FIGS. 4, 5, and 6, a plurality of guide ribs 32R that extend in the left-right direction are formed side by side in the front-rear direction on an inner surface of the opening and closing cover 32. An upper guide surface 32A is formed by lower end edges of the guide ribs 32R. The upper guide surface 32A defines an upper path P1A, which will be described later, of the conveyance path P1 from above.

An upper surface of the upper chute member 130 is formed with a first upper conveying surface 130A and a second upper conveying surface 130B. The first upper conveying surface 130A is a flat surface that is adjacent to a left end of the supply tray 12 and is inclined downward to a left side. The first upper conveying surface 130A of the upper chute member 130 and the sheet feeding surface 12A of the supply tray 12 constitute a loading surface 150A. The plurality of sheets SH to be read, which are conveyed by the conveyance unit 6, are loaded on the loading surface 150A. The second upper conveying surface 130B is a substantially flat surface inclined upward to the left side following the first upper conveying surface 130A.

Lower guide surfaces 140A1 and 140A2 are formed on a lower surface of the lower chute member 140. The lower guide surface 140A1 is a substantially flat surface inclined downward to a right side from a vicinity of a left end portion in the ADF 9 toward the reading surface 101B. The lower guide surface 140A2 is a substantially flat surface inclined upward to the right side following the lower guide surface 140A1. An upper surface of the base member 9A is formed with a lower conveying surface 140B1 facing the lower guide surface 140A1 from below and a lower conveying surface 140B2 facing the lower guide surface 140A2 from below.

The conveyance path P1 in the conveyance unit 6 is defined as a space surrounded by the first upper conveying surface 130A and the second upper conveying surface 130B of the upper chute member 130, the lower guide surfaces 140A1 and 140A2 of the lower chute member 140, the upper guide surface 32A of the opening and closing cover 32, the lower conveying surfaces 140B1 and 140B2 of the base member 9A, various conveyance rollers, and the like. More specifically, the conveyance path P1 includes the upper path P1A that is a portion that extends to the left side along the first upper conveying surface 130A and the second upper conveying surface 130B of the upper chute member 130 from the sheet feeding surface 12A of the supply tray 12. Next, the conveyance path P1 includes a curved path P1B that is a portion connected to the upper path P1A and curved downward. Next, the conveyance path P1 includes a lower path P1C that is connected to the curved path P1B, and that includes a portion that is inclined downward from a lower end of a curved portion toward the reading surface 101B and then extends short to the right side along the reading surface 101B and a portion that is inclined upward from a right end of the reading surface 101B toward a further right side and reaches the discharge tray 14. The upper path P1A and the lower path P1C overlap each other in an upper-lower direction. A conveying direction of the sheets SH conveyed by the conveyance unit 6 is leftward in the upper path P1A of the conveyance path P1, is changed from leftward to rightward in the curved path P1B of the conveyance path P1, and is rightward in the lower path P1C of the conveyance path P1. The extending direction and a shape of the conveyance path P1 are examples.

Separation Roller, Separation Pad, Sheet Feeding Roller, etc.

As shown in FIGS. 4, 5, and 6, the conveyance unit 6 includes a separation unit 50, a separation pad 56A, and a separation bank 56B. Although the details will be described later, the separation unit 50 includes a separation roller 54 including a rotation shaft 54S, a holder 51, and a sheet feeding roller 92 including a rotation shaft 92S.

The separation roller 54 is positioned leftward of the sheet feeding roller 92, that is, downstream of the conveyance path P1 in the conveying direction. Then, the separation roller 54 is provided at a position facing the second upper conveying surface 130B of the upper chute member 130 from above. The rotation shaft 54S of the separation roller 54 is a columnar shaft body that extends around a rotation axis X54 that extends in the front-rear direction, which is a direction orthogonal to the conveying direction of the sheets SH. As shown in FIG. 6, a front end and a rear end of the rotation shaft 54S of the separation roller 54 are respectively rotatably supported by a front cover 31F that forms a front end portion of the ADF 9 and a frame (not shown) disposed inside a rear cover 31R that forms a rear end of the ADF 9. The separation roller 54 is assembled to a central portion of the rotation shaft 54S.

As shown in FIG. 4, the separation pad 56A forms a conveying surface of the sheets SH together with the second upper conveying surface 130B. The separation pad 56A is provided at a position facing the separation roller 54 from below. The separation pad 56A is a plate-shaped body made of a soft material such as rubber or elastomer. The separation pad 56A is pressed toward the separation roller 54 by, for example, an urging spring (not shown). As shown in FIGS. 5 and 6, the separation bank 56B is provided between the sheet feeding roller 92 and the separation roller 54 in the conveyance path P1.

As shown in FIGS. 4, 5, and 6, the holder 51 houses the separation roller 54 while covering the separation roller 54 from above and sandwiching the separation roller 54 from front and rear sides. Details will be described later. The holder 51 is supported by the rotation shaft 54S so as to be swingable around the rotation axis X54 of the separation roller 54. Further, the holder 51 extends rightward with respect to the rotation shaft 54S, that is, toward an upstream side in the conveying direction.

As shown in FIGS. 4, 5, and 6, the sheet feeding roller 92 is provided at a position facing the first upper conveying surface 130A of the upper chute member 130 from above. Then, the sheet feeding roller 92 is contactable with the sheets SH loaded on the loading surface 150A from above. The sheet feeding roller 92 is positioned on a right side of the separation roller 54 and is housed in the holder 51. The sheet feeding roller 92 is supported by the holder 51 so as to be rotatable around a rotation axis X92 parallel to the rotation axis X54. Therefore, when the holder 51 swings upward or downward around the rotation axis X54 of the separation roller 54, the sheet feeding roller 92 is displaceable between a position close to the loading surface 150A and a position away from the loading surface 150A.

As shown in FIG. 6, a transmission gear 55 is provided at a rear end of the rotation shaft 54S. The transmission gear 55 rotates the rotation shaft 54S by driving a motor 70 described later. When the transmission gear 55 is rotated, the rotation shaft 54S is rotated, and the separation roller 54 and the sheet feeding roller 92 are rotated in synchronization with each other. An outer peripheral surface 92A of the sheet feeding roller 92 applies a conveying force to a sheet SH at an uppermost position among the sheets SH loaded on the loading surface 150A, and feeds the sheet SH toward the separation roller 54. As shown in FIGS. 4, 5, and 6, the separation roller 54 cooperates with the separation bank 56B and the separation pad 56A to separate the sheets SH conveyed by the sheet feeding roller 92 one by one, and to convey the sheets SH downstream in the conveying direction in the conveyance path P1.

Conveyance Roller

As shown in FIGS. 4, 5, and 6, the conveyance unit 6 includes a first conveyance roller 44 and a pinch roller 44P in the upper path P1A of the conveyance path P1 at positions on a left side of the separation roller 54, that is, on a downstream side in the conveying direction with respect to the separation roller 54. The first conveyance roller 44 and the pinch roller 44P are rotated by the driving force transmitted from the motor 70, nip the sheet SH separated one by one by the separation roller 54, the separation bank 56B, and the separation pad 56A, and convey the sheet SH toward downstream in the conveying direction along the conveyance path P1. The first conveyance roller 44 is an example of a conveyance roller.

As shown in FIGS. 4 and 5, the conveyance unit 6 includes a curved guide surface 45G, a curved guide surface 45H, a second conveyance roller 45, and a pinch roller 45P in the curved path P1B of the conveyance path P1. The curved guide surface 45G and the curved guide surface 45H face each other with a predetermined interval therebetween. The curved guide surface 45G defines a portion that curves downward in the curved path P1B from an outside. The curved guide surface 45H defines a portion that curves downward in the curved path P1B from an inside. The second conveyance roller 45 and the pinch roller 45P are arranged at a lower end portion of the curved path P1B. The second conveyance roller 45 and the pinch roller 45P nip the sheet SH conveyed by the first conveyance roller 44 and the pinch roller 44P, and further convey the sheet SH toward the reading surface 101B. A left portion of the lower path P1C is defined by the lower guide surface 140A1 and the lower conveying surface 140B1 facing each other at a predetermined interval between the first conveyance roller 44 as well as the pinch roller 44P and the reading surface 101B.

As shown in FIGS. 4 and 5, the conveyance unit 6 further includes a sheet discharge roller 48 and a pinch roller (not shown). A right portion of the lower path P1C is defined by the lower guide surface 140A2 and the lower conveying surface 140B2 facing each other at a predetermined interval between the reading surface 101B and the sheet discharge roller 48 as well as the pinch roller.

A path formed by the lower guide surface 140A2 and the lower conveying surface 140B2 is inclined upward toward the sheet discharge roller 48 and the pinch roller on a right side of a pressing member 49. The sheet discharge roller 48 includes a driving shaft 48a, and is positioned at a right end portion of the lower guide surface 140A2 of the lower chute member 140. The pinch roller is positioned at a right end portion of the lower conveying surface 140B2. The sheet discharge roller 48 and the pinch roller nip the sheet SH that has passed over the reading surface 101B, and discharge the sheet SH toward the sheet discharge surface 14A of the discharge tray 14.

Stopper

As shown in FIGS. 5 and 6, the ADF 9 according to the present embodiment includes a pair of front and rear stoppers 80F and 80R that are positioned between the separation roller 54 and the sheet feeding roller 92 and abut against a distal end of the sheet SH in the conveying direction to regulate a movement of the sheet SH. Hereinafter, as appropriate, the front stopper 80F and the rear stopper 80R are collectively referred to simply as "stopper 80".

Figure 7A:
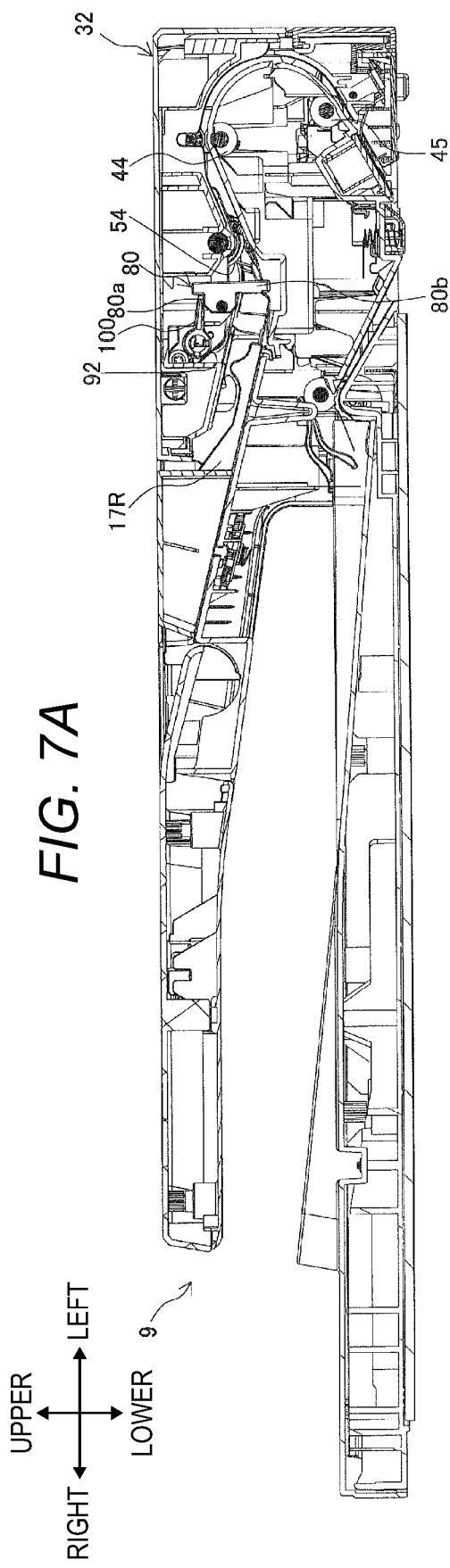
FIG. 7A is a cross-sectional view showing a state where a stopper is engaged with a lock lever.
Figure 7B:
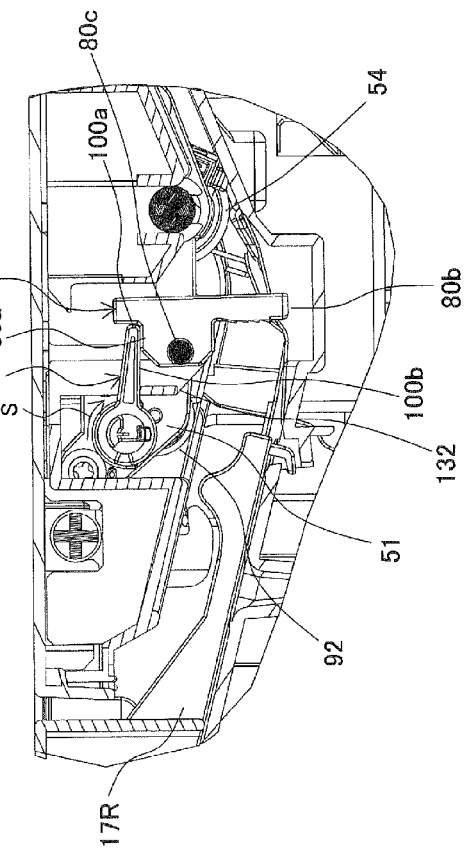
FIG. 7B is a partially enlarged view thereof.

The stopper 80 is configured such that a position can be switched between a regulated state shown in FIGS. 7A and 7B and a regulation release state shown in FIGS. 8A and 8B. In this example, in the regulated state, the stopper 80 protrudes toward the first upper conveying surface 130A that defines the conveyance path P1 of the sheet SH by being engaged with a lock lever 100 as described later, thereby regulating passage of the sheet SH. A position of the stopper 80 at this time is an example of a first position. Further, in the regulation release state, the stopper 80 is released from the engagement by the lock lever 100 and is in a free state as described later, so that the stopper 80 is pushed by a distal end of the sheet SH, is rotated from the first position, retracts upward so as to be away from the first upper conveying surface 130A, and allows the sheet SH to move to a downstream side, that is, allows the sheet SH to pass through. A position of the stopper 80 at this time is an example of a second position. The stopper 80 is supported by the opening and closing cover 32 together with the holder 51 including the separation roller 54 and the sheet feeding roller 92.

Transmission of Driving Force to Conveyance Roller and Sheet Discharge Roller

In the multifunction device 1, a transmission path and a transmission mode of a driving force from the motor 70, which is a common driving source, to the first conveyance roller 44, the second conveyance roller 45, and the sheet discharge roller 48 are different from a transmission path and a transmission mode of a driving force from the motor 70 to the separation roller 54 and the sheet feeding roller 92. First, transmission of the driving force to the first conveyance roller 44, the second conveyance roller 45, and the sheet discharge roller 48 will be described with reference to FIGS. 9 and 10.

Figure 9:
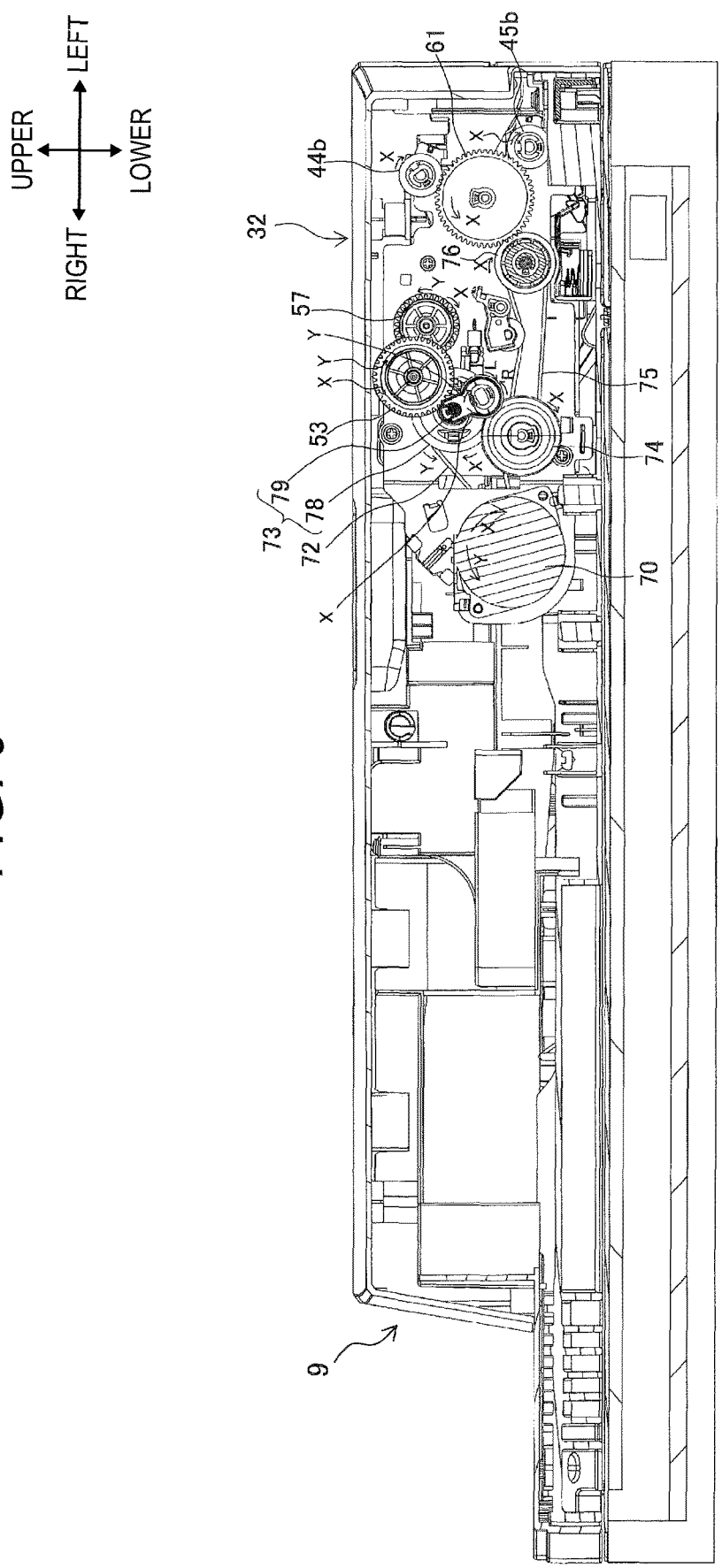
FIG. 9 is a transverse cross-sectional view showing a configuration in which a driving force from a motor is transmitted to a conveyance roller and a sheet discharge roller.
Figure 10:
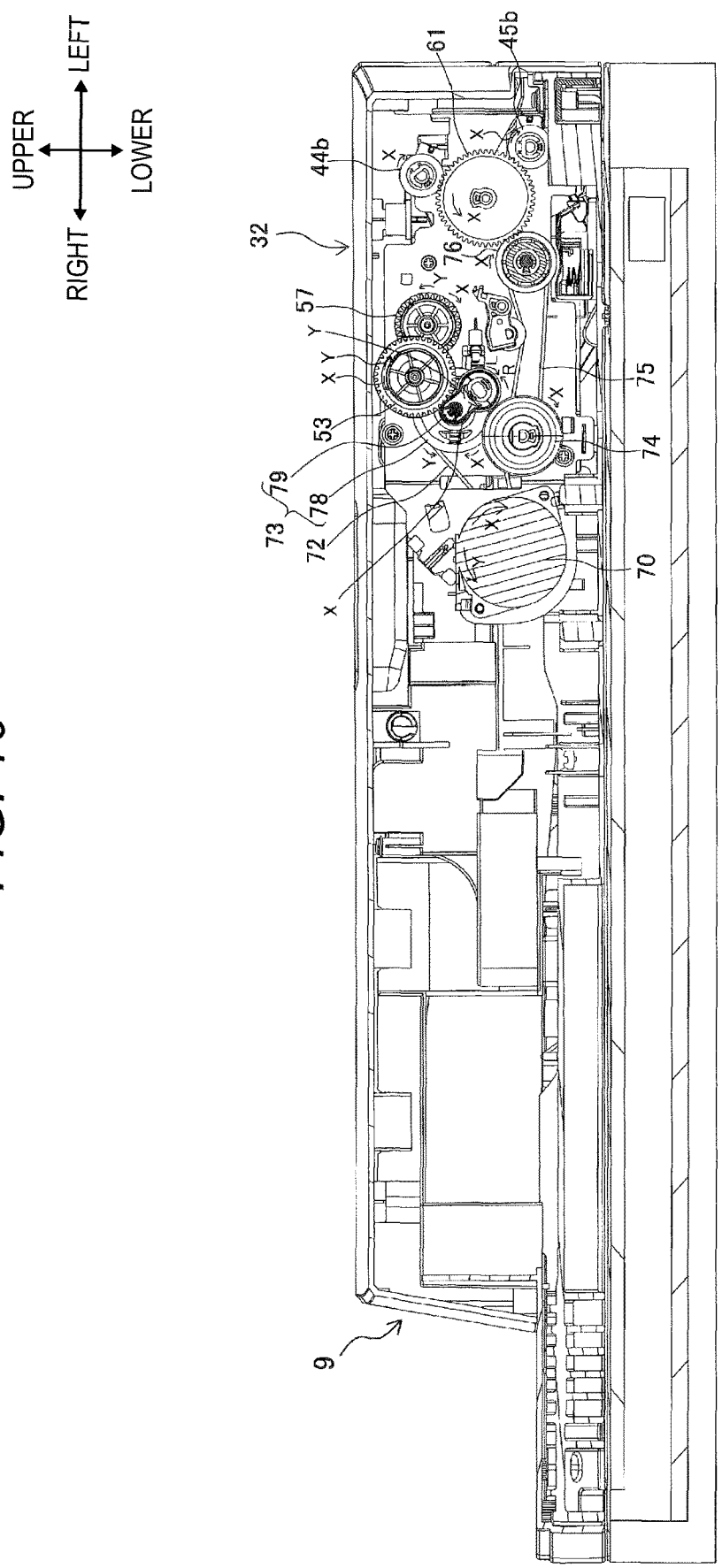
FIG. 10 is a transverse cross-sectional view showing the configuration in which the driving force from the motor is transmitted to the conveyance roller and the sheet discharge roller.

As shown in FIGS. 9 and 10, the ADF 9 includes the motor 70, a planetary gear mechanism 73, a toothed pulley 74, a belt 75, a toothed pulley 76, a transmission gear 61, a driving gear 44b fixed to the rotation shaft 44a of the first conveyance roller 44, a driving gear 45b fixed to the rotation shaft 45a of the second conveyance roller 45, an intermediate gear 53, and a transmission gear 55 fixed to the rotation shaft 54S of the separation roller 54.

The motor 70 is a motor that does not generate torque when not energized, in this example, a stepping motor, and forward rotation, reverse rotation, and rotation stop thereof are controlled by a controller 110 described later. Further, the controller 110 can control an amount of rotation in each direction with respect to the motor 70. In the motor 70, a rotation direction indicated by a clockwise direction in FIG. 9 is defined as a rotation direction in an X direction, and a rotation direction indicated by a counterclockwise direction is defined as a rotation direction in a Y direction. Then, rotation of the motor 70 in the X direction is defined as forward rotation, and rotation of the motor 70 in the Y direction is defined as reverse rotation. The X direction is an example of a second rotation direction, and the Y direction is an example of a first rotation direction.

The planetary gear mechanism 73 includes a sun pulley 78 and a planetary gear 79. The motor 70 is connected to the sun pulley 78 of the planetary gear mechanism 73 via a pulley (not shown) and the belt 72. The planetary gear 79 of the planetary gear mechanism 73 is coaxially coupled to a gear (not shown) provided on the sun pulley 78, and is rotated and revolved in accordance with rotation of the sun pulley 78. A position of the planetary gear 79 is switched between a transmission position where the planetary gear 79 is coupled to the toothed pulley 74 and a blocking position where the planetary gear 79 is separated from the toothed pulley 74, depending on a rotation direction of the motor 70.

Transmission of Driving Force to First Conveyance Roller, Second Conveyance Roller, and Sheet Discharge Roller For example, when the motor 70 rotates in the X direction in the drawing, the sun pulley 78 is also rotated in the X direction. As the sun pulley 78 is rotated in the X direction, the planetary gear 79 is revolved in an L direction in the drawing while rotating in the X direction. Then, as shown in FIG. 9, when the planetary gear 79 is coupled to the toothed pulley 74 and is shifted from the blocking position to the transmission position, the toothed pulley 74 prevents the planetary gear 79 from revolving in the L direction. Accordingly, the toothed pulley 74 is rotated in the X direction as the planetary gear 79 is rotated in the X direction. That is, at the transmission position, the driving force of the motor 70 is transmitted to the toothed pulley 74. The driving force accompanying forward rotation of the motor 70 at this time is an example of a second driving force. The driving shaft 48a connected to the toothed pulley 74 is driven by rotation of the toothed pulley 74 in the X direction, so that the sheet discharge roller 48 is rotated.

The rotation of the toothed pulley 74 in the X direction is transmitted to the toothed pulley 76 via the transmission belt 75, and the toothed pulley 76 is rotated in the X direction. When the toothed pulley 76 is rotated in the X direction, the transmission gear 61 that meshes with the toothed pulley 76 is rotated in the X direction. As a result, the driving gear 44b and the driving gear 45b that mesh with the transmission gear 61 is rotated in the X direction, the rotation shaft 44a fixed to the driving gear 44b is rotated to rotate the first conveyance roller 44, and the rotation shaft 45a fixed to the driving gear 45b is rotated to rotate the second conveyance roller 45. Accordingly, the sheet SH fed by the sheet feeding roller 92 and the separation roller 54 after being set in the supply tray 12 is conveyed. At this time, gear ratios of the toothed pulleys 74 and 76, the transmission gear 61, the driving gears 44b and 45b, and the like, and radii of the first conveyance roller 44, the second conveyance roller 45, and the separation roller 54 are set to appropriate values such that a conveying speed of the sheet SH by the first conveyance roller 44 is faster than a conveying speed of the sheet SH by the separation roller 54 and the sheet feeding roller 92, and conveying speeds of the first conveyance roller 44 and the second conveyance roller 45 are substantially equal to each other. The number of conveyance rollers is not limited to two, that is, the first conveyance roller 44 and the second conveyance roller 45, and three or more conveyance rollers may be appropriately provided along the conveyance path P1. In this case, the second driving force is transmitted from the motor 70 to the conveyance rollers other than the first conveyance roller 44 and the second conveyance roller 45 in the same manner as described above. Alternatively, contrary to the above, only one of the first conveyance roller 44 and the second conveyance roller 45 may be provided.

Contrary to the above, when the motor 70 rotates in the Y direction, the sun pulley 78 is also rotated in the Y direction. The driving force accompanying reverse rotation of the motor 70 at this time is an example of a first driving force. As the sun pulley 78 is rotated in the Y direction, the planetary gear 79 is revolved in an R direction while rotating in the Y direction. When the planetary gear 79 is revolved in the R direction, as shown in FIG. 10, coupling between the planetary gear 79 and the toothed pulley 74 is released, and the transmission path of the driving force described above is blocked, so that the driving force of the motor 70 is not transmitted to the first conveyance roller 44, the second conveyance roller 45, and the sheet discharge roller 48.

Transmission of Driving Force to Separation Roller and Sheet Feeding Roller

Figure 11:
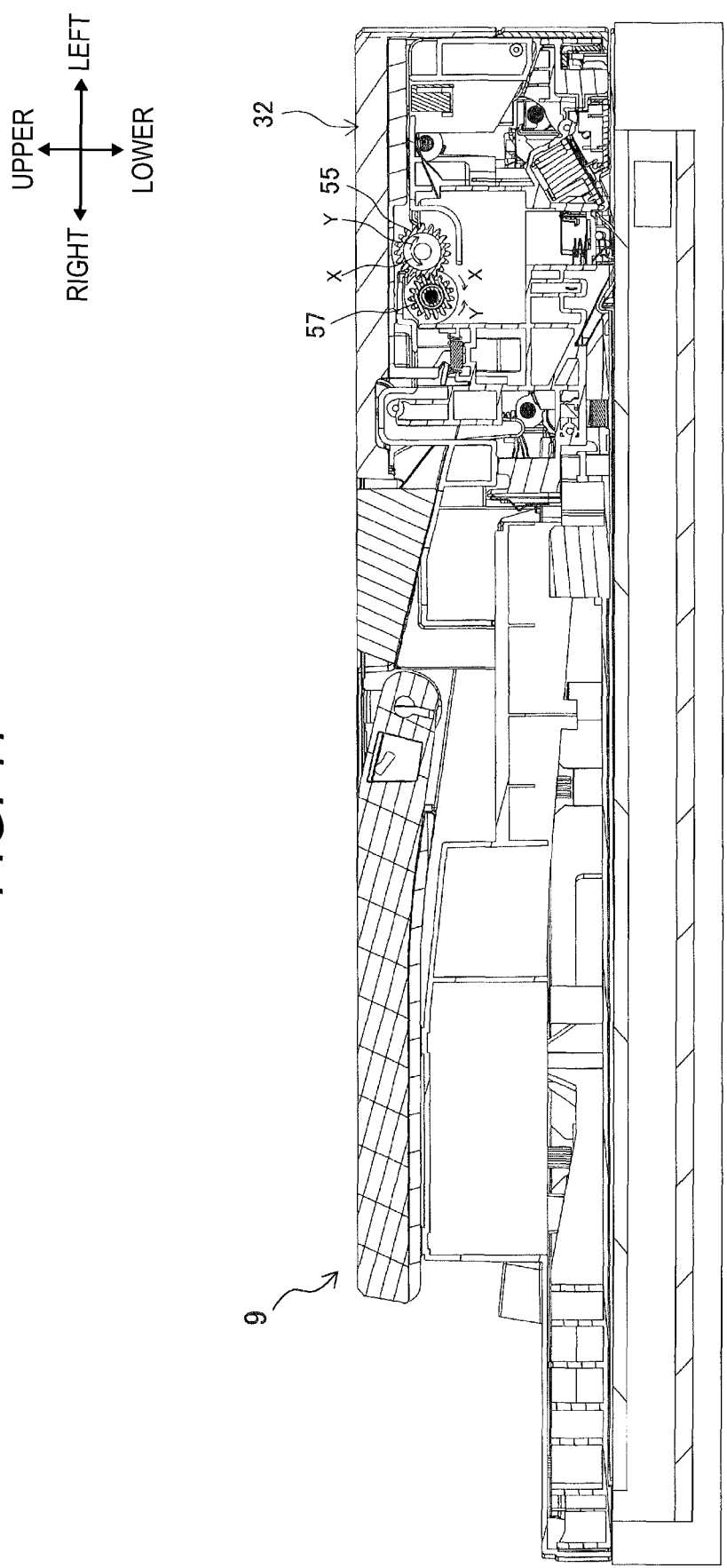
FIG. 11 is a transverse cross-sectional view for illustrating a configuration in which the driving force from the motor is transmitted to the separation roller.
Figure 12:
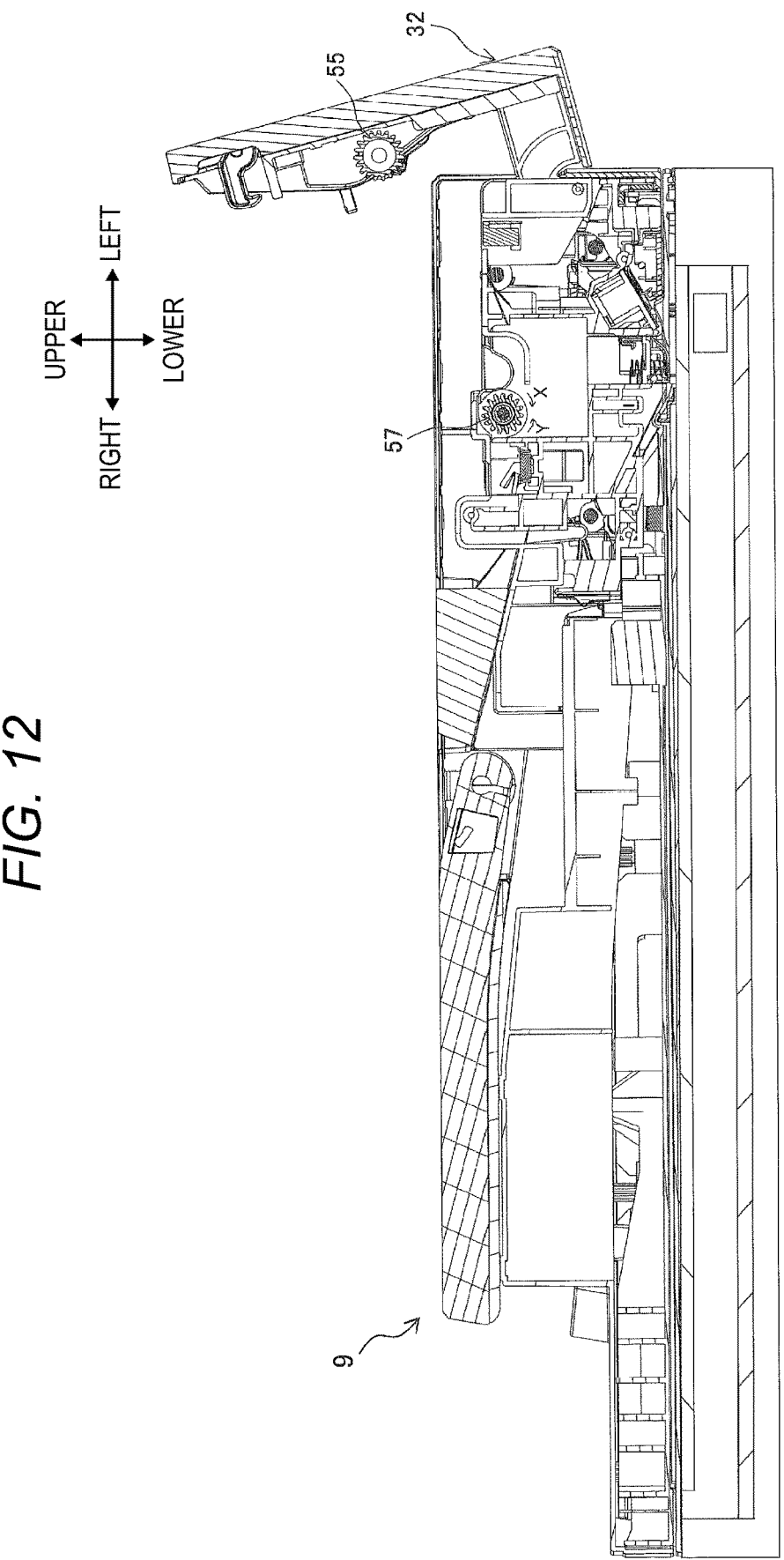
FIG. 12 is a transverse cross-sectional view showing a state where the opening and closing cover is opened in the structure shown in FIG. 11.

On the other hand, the intermediate gear 53 is operatively connected to the sun pulley 78 of the planetary gear mechanism 73 regardless of whether the planetary gear 79 is positioned at the transmission position or the blocking position. That is, the driving force of the motor 70 transmitted to the sun pulley 78 as described above is transmitted to the intermediate gear 53 via rotation of the sun pulley 78, and the intermediate gear 53 is rotated. When the intermediate gear 53 is rotated, an intermediate gear 57 operatively connected to the intermediate gear 53 via a gear or a pulley (not shown) is rotated. As shown in FIG. 11, which is a cross-sectional view having a cross section different from those of FIGS. 9 and 10, the intermediate gear 57 meshes with the transmission gear 55, and the transmission gear 55 is rotated by rotation of the intermediate gear 57. As a result, the rotation shaft 54S of the separation roller 54 is rotated. As shown in FIG. 12, when the opening and closing cover 32 is opened, the rotation shaft 54S of the separation roller 54 and the transmission gear 55 are lifted upward together with the opening and closing cover 32, and the meshing between the intermediate gear 57 and the transmission gear 55 is released.

For example, when the motor 70 rotates in the X direction and the sun pulley 78 is rotated in the X direction, the intermediate gear 53 is rotated in the X direction, whereby the intermediate gear 57 and the transmission gear 55 are rotated in the X direction. As a result, the separation roller 54 conveys the sheet SH fed from the sheet feeding roller 92 after being set in the supply tray 12 to the first conveyance roller 44 and the second conveyance roller 45 on a further downstream side. Conversely, for example, when the motor 70 rotates in the Y direction and the sun pulley 78 is rotated in the Y direction, the intermediate gear 53 is rotated in the Y direction, whereby the intermediate gear 57 and the transmission gear 55 are rotated in the Y direction. The stopper 80 is switched by the rotation of the transmission gear 55 in the Y direction, which will be described later.

Stopper Switching Mechanism

A state of the stopper 80 is switched by using transmission of the driving force to the separation roller 54. Hereinafter, details thereof will be described with reference to FIGS. 7A to 8B and FIGS. 13 to 15C described above.

Figure 13:
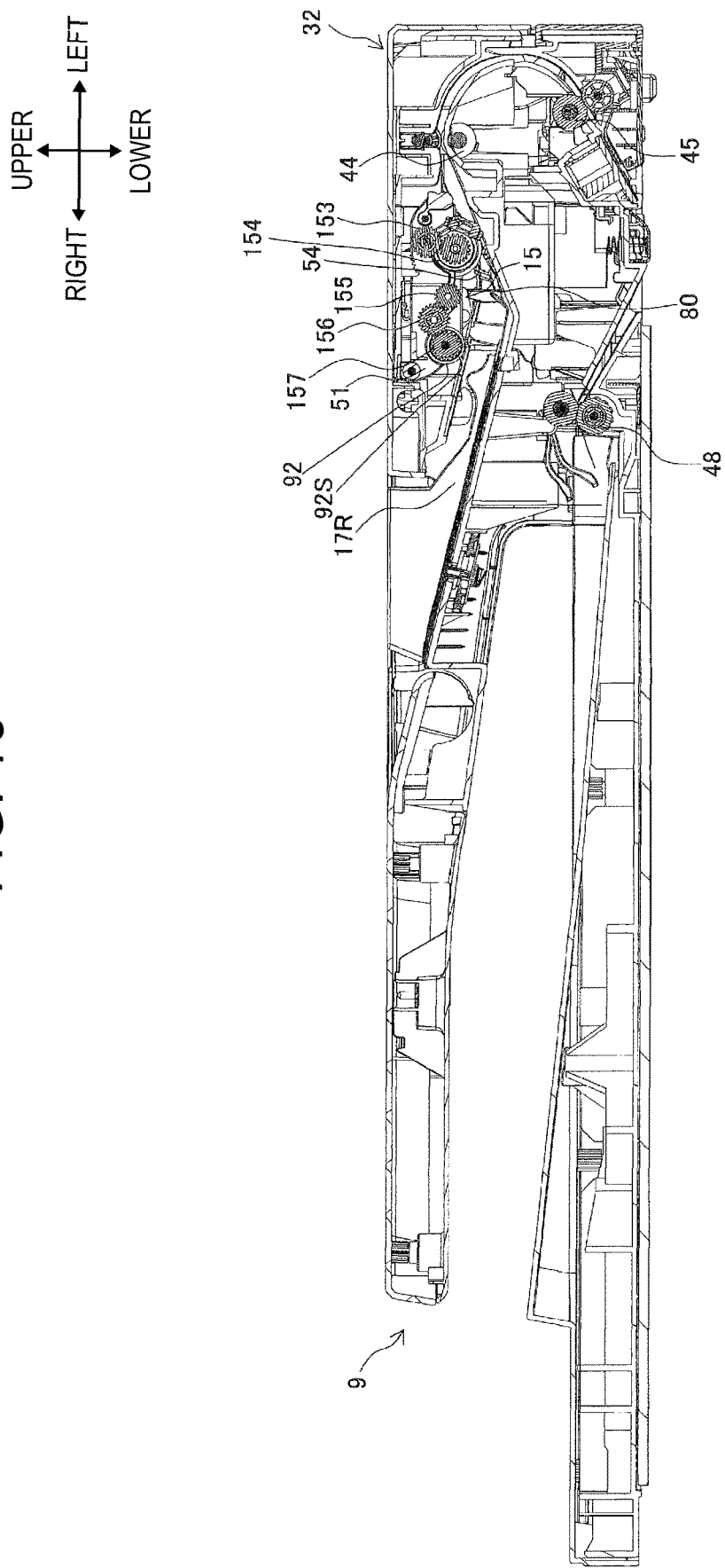
FIG. 13 is a transverse cross-sectional view for illustrating a configuration in which the driving force from the motor is transmitted to the sheet feeding roller.

In FIG. 13, as described above, the separation roller 54 and the sheet feeding roller 92 are provided in the holder 51, and the holder 51 is swingably supported by the rotation shaft 54S of the separation roller 54. The holder 51 is further provided with a shaft gear 154 fixed to the rotation shaft 54S, a planetary gear 153 that meshes with the shaft gear 154 and is movable by meshing with fixed teeth 32a provided on the opening and closing cover 32, an intermediate gear 156 that meshes with a shaft gear 157 fixed to the rotation shaft 92S of the sheet feeding roller 92, and an intermediate gear 155 that meshes with the intermediate gear 156. The shaft gear 154, the planetary gear 153, the intermediate gears 155 and 156, and the shaft gear 157 constitute a gear mechanism 15 that transmits the driving force input from the motor 70 to the rotation shaft 54S of the separation roller 54 to the rotation shaft 92S of the sheet feeding roller 92.

Figure 14A:
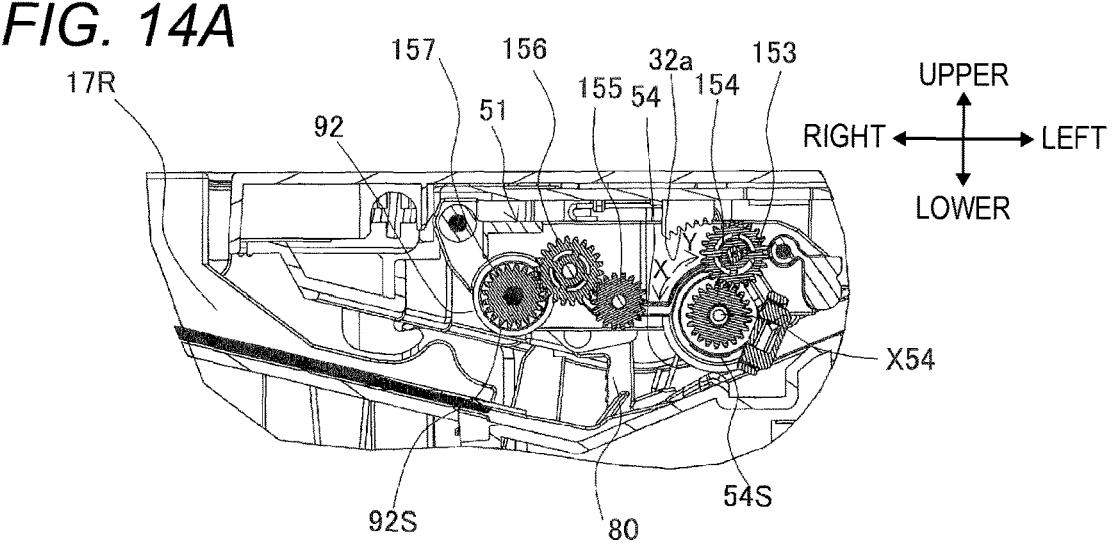
FIGS. 14A to 14C are partially enlarged cross-sectional views for illustrating transmission and blocking of the driving force because of movement of a planetary gear and a swing of a holder.
Figure 14B:
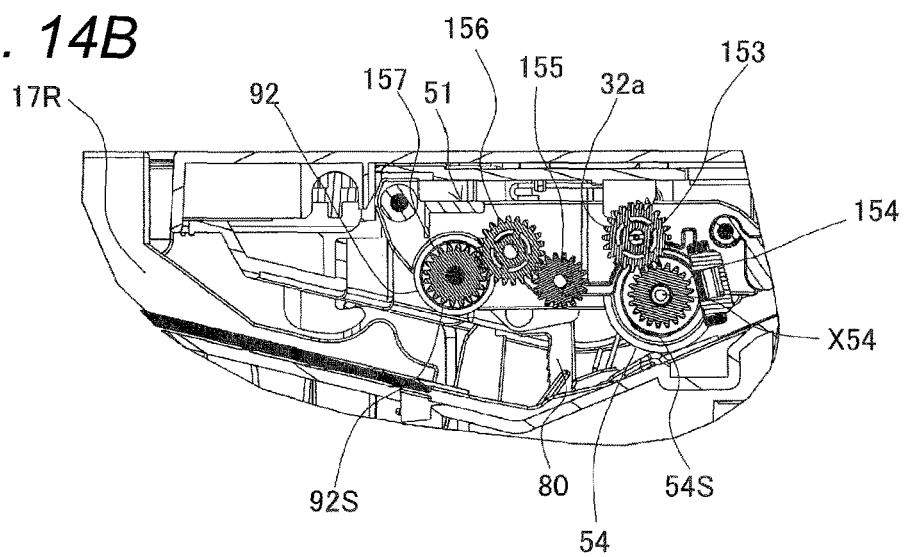
Figure 14C:
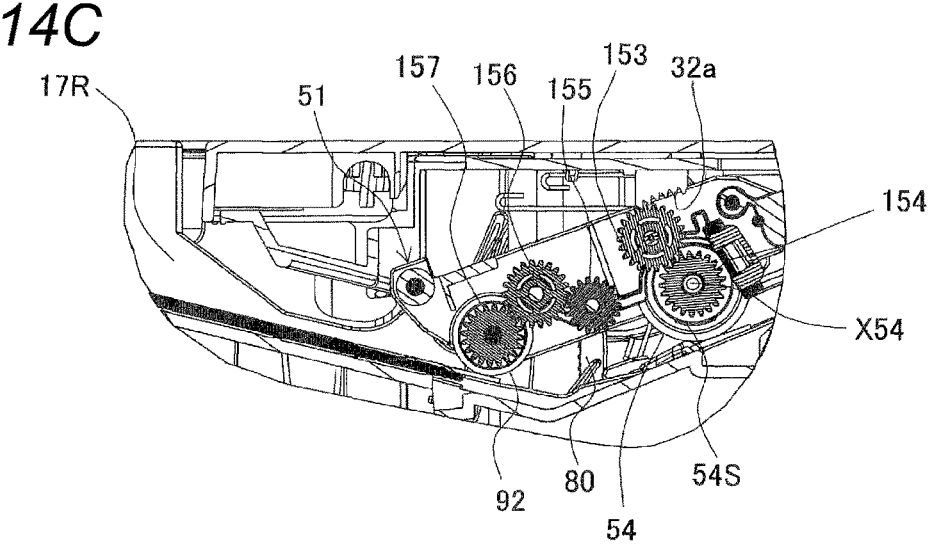

As described above, when the driving force accompanying the rotation of the motor 70 in the X direction is input to the rotation shaft 54S and the rotation shaft 54S is rotated in the X direction in FIG. 14A, the planetary gear 153 is moved to an upstream side in the conveying direction and meshes with the fixed teeth 32a as shown in FIG. 14B. When the rotation shaft 54S is further rotated in the X direction in the meshed state, the holder 51 is swung around the rotation axis X54 such that a sheet feeding roller 92 side is lowered as shown in FIG. 14C. Accordingly, the sheet feeding roller 92 abuts against the sheet SH.

As described above with reference to FIGS. 7A to 8B, the stopper 80 is provided in the vicinity of the holder 51 in the opening and closing cover 32. The stopper 80 is rotatably supported by the opening and closing cover 32 with a shaft member 80c as a center of rotation, and includes a stepped portion 80a and a sheet regulating portion 80b. The lock lever 100 is rotatably supported in the vicinity of the sheet feeding roller 92 in the holder 51. The lock lever 100 is biased in an S direction shown in FIGS. 7B and 8B by an appropriate spring member (not shown). As shown in FIGS. 13, 14A, and 14B, in a state before the holder 51 is swung such that the sheet feeding roller 92 side is lowered as described above, a distal end portion 100a of the lock lever 100 abuts against and engages with the stepped portion 80a as shown in FIGS. 7A and 7B. As a result, the rotation of the stopper 80 is prevented, and the regulated state is established.

When the holder 51 is rotated around the rotation axis X54 of the rotation shaft 54S in conjunction with a movement of the planetary gear 153 as described above and the holder 51 is swung such that the sheet feeding roller 92 side is lowered as shown in FIG. 14C, an abutted surface 100b of the lock lever 100 abuts against an abutment rib 132 provided on the opening and closing cover 32. Accordingly, the lock lever 100 is displaced so as to rotate in a direction opposite to the S direction as shown in FIGS. 8A and 8B. As a result, the engagement between the distal end portion 100a of the lock lever 100 and the stepped portion 80a is released, and the stopper 80 is in a freely rotatable state, that is, in the regulation release state.

Figure 15A:
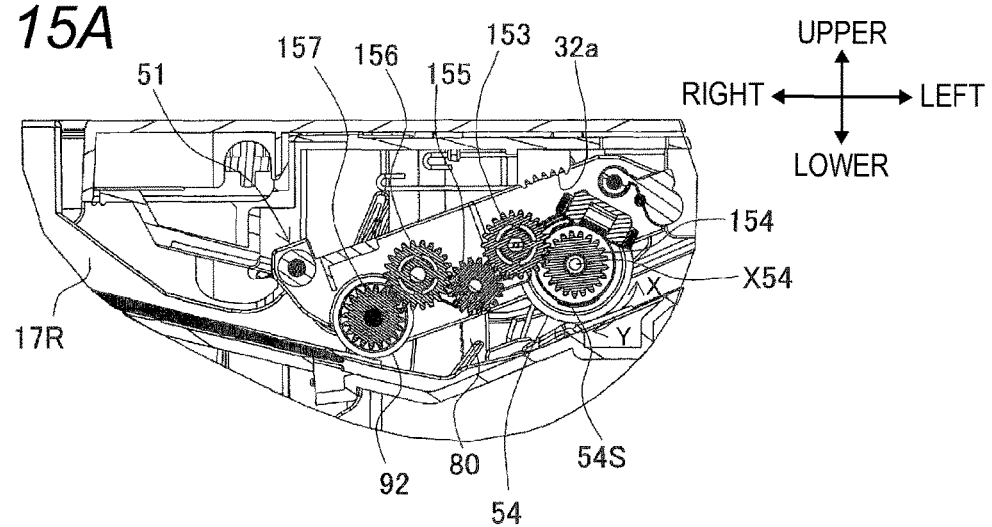
FIGS. 15A to 15C are partially enlarged cross-sectional views for illustrating the transmission and the blocking of the driving force because of movement of the planetary gear and a swing of the holder.

After the state shown in FIG. 14C, the planetary gear 153 is further moved to the upstream side in the conveying direction, so that the meshing between the planetary gear 153 and the fixed teeth 32a is released as shown in FIG. 15A. The planetary gear 153 released from the fixed teeth 32a meshes with the intermediate gear 155 as shown in FIG. 15A. Accordingly, the driving force from the motor 70 is transmitted to the shaft gear 157 via the rotation shaft 54S, the planetary gear 153, the intermediate gear 155, and the intermediate gear 156, and the sheet feeding roller 92 is rotated to convey the sheet SH to the curved path P1B. At this time, gear ratios of the shaft gear 154, the planetary gear 153, the intermediate gears 155 and 156, and the shaft gear 157, and radii of the separation roller 54 and the sheet feeding roller 92 are set to appropriate values such that a conveying speed of the sheet SH by the separation roller 54 is faster than a conveying speed of the sheet SH by the sheet feeding roller 92.

Figure 15B:
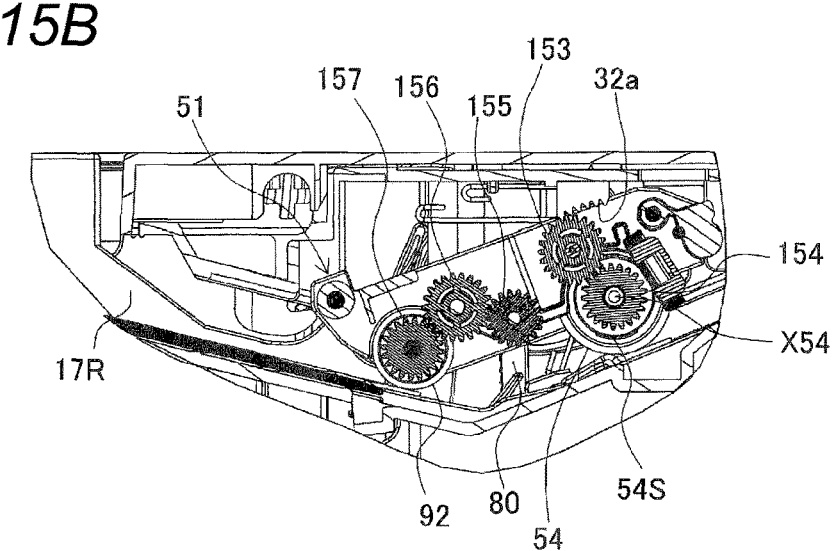
Figure 15C:
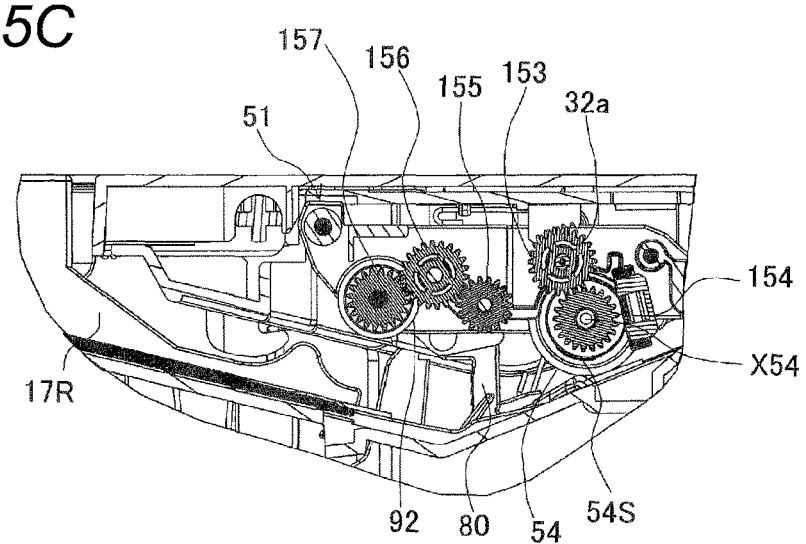

On the other hand, when the driving force accompanying the rotation of the motor 70 in the Y direction is input to the rotation shaft 54S and the rotation shaft 54S is rotated in the Y direction in FIG. 15A, the planetary gear 153 is moved to a downstream side in the conveying direction opposite to the above, and the meshing with the intermediate gear 155 is released. Accordingly, the transmission of the driving force from the motor 70 to the sheet feeding roller 92 is blocked. Thereafter, the planetary gear 153 is further moved and meshes with the fixed teeth 32a as shown in FIG. 15B. When the rotation shaft 54S is further rotated in the Y direction in the meshed state, the holder 51 is swung around the rotation axis X54 such that the sheet feeding roller 92 side is raised as shown in FIG. 15C. Accordingly, the sheet feeding roller 92 is separated from the sheet SH.

When the holder 51 is swung such that the sheet feeding roller 92 side is raised in conjunction with the movement of the planetary gear 153 as described above, the lock lever 100, which is lifted by the abutted surface 100b abutting against the abutment rib 132 as described above with reference to FIGS. 8A and 8B, is displaced so as to rotate in the S direction as shown in FIGS. 7A and 7B. As a result, the distal end portion 100a of the lock lever 100 and the stepped portion 80a are engaged with each other, and the stopper 80 is in the regulated state.

Electrical Configuration of Multifunction Device

Figure 16:
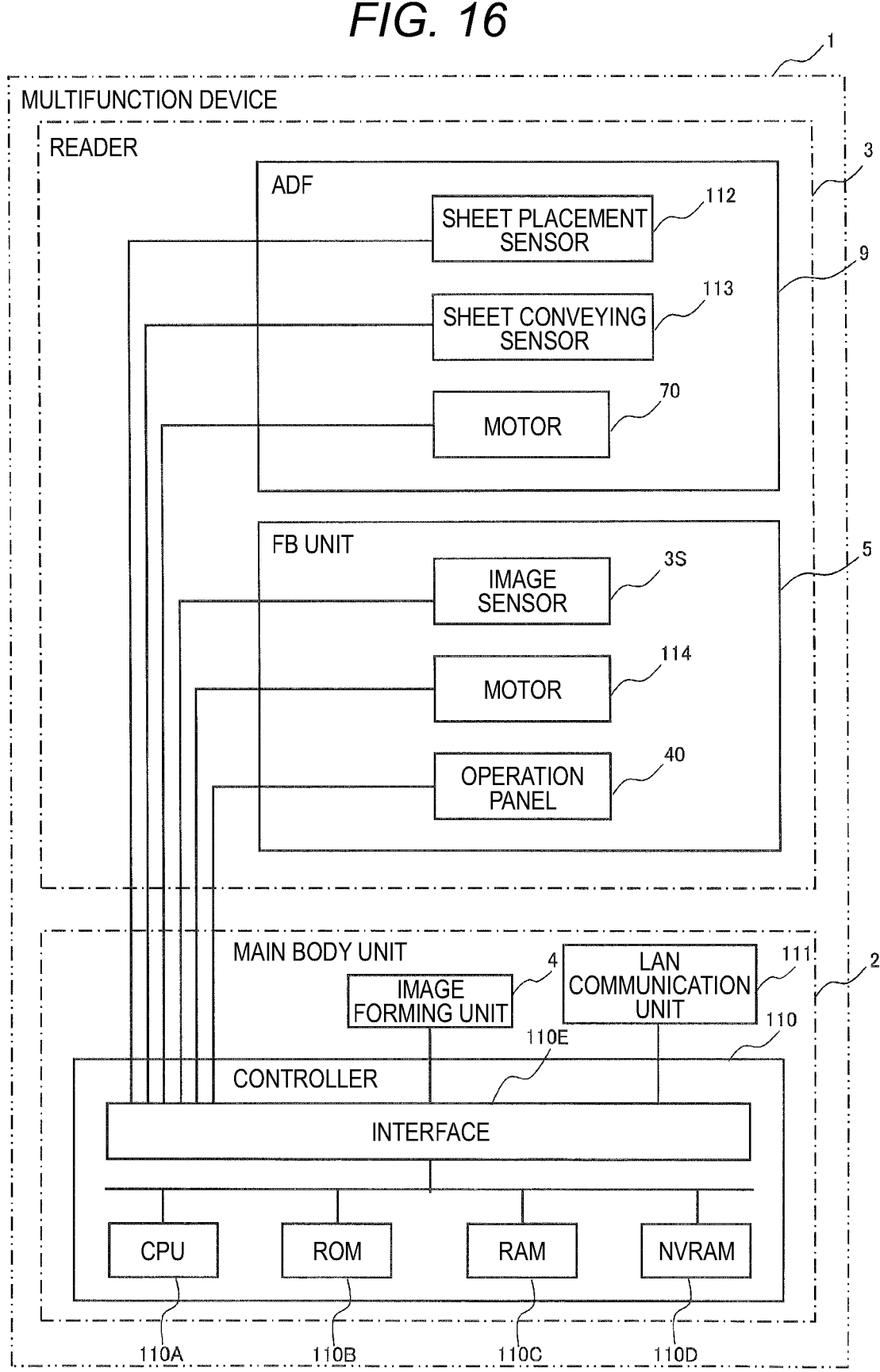
FIG. 16 is a functional block diagram showing an electrical configuration of the multifunction device.

Next, an electrical configuration of the multifunction device 1 according to the present embodiment will be described. As shown in FIG. 16, the main body unit 2 of the multifunction device 1 is provided with the controller 110. The controller 110 includes a known CPU 110A, a ROM 110B, a RAM 110C, an NVRAM 110D, an interface 110E, and the like. The CPU 110A executes a predetermined processing in accordance with a control program stored in the ROM 110B, the RAM 110C, or the like. Accordingly, control is executed for units of the multifunction device 1.

Control targets of the controller 110 include the image forming unit 4, a LAN communication unit 111, the operation panel 40, the image sensor 3S, a sheet conveying sensor 113, the motor 70, a motor 114, a sheet placement sensor 112, and the like. Among the above units, the image forming unit 4 and the LAN communication unit 111 are provided in the main body unit 2. The operation panel 40, the image sensor 3S, and the motor 114 are provided in the FB unit 5.

The sheet placement sensor 112, the motor 70, and the sheet conveying sensor 113 are provided in the ADF 9.

The controller 110 monitors signals from the sheet placement sensor 112 and the LAN communication unit 111. The LAN communication unit 111 includes a communication interface corresponding to a wireless LAN and a communication interface corresponding to a wired LAN. The motor 114 is a power source for moving the image sensor 3S in a left-right direction in the FB unit 5. The sheet placement sensor 112 is a sensor that detects that the sheet SH is placed on the loading surface 150A. The sheet conveying sensor 113 is a sensor that detects that a distal end in the conveying direction and a rear end in the conveying direction of the sheet SH conveyed in the ADF 9 have passed a predetermined detection position in the conveyance path P1.

Present Embodiment

In the present embodiment, when the driving force is transmitted from the motor 70 to the sheet feeding roller 92 and the separation roller 54 to rotationally drive the rollers, the transmission path of the driving force is configured such that the sheet feeding roller 92 starts rotating after the separation roller 54 starts rotating. Hereinafter, details thereof will be described.

As shown in FIGS. 9 and 10 described above, the motor 70 rotates in a reverse direction in the Y direction or is rotated in a forward direction in the X direction, which is an opposite rotation direction, and generates a driving force corresponding to the respective rotation directions. The sheet feeding roller 92 is rotated in the X direction by the driving force transmitted from the forward-rotating motor 70, and feeds the sheet SH in the conveying direction. The separation roller 54 is positioned downstream of the sheet feeding roller 92 in the conveying direction, is rotated in the X direction by the driving force transmitted from the forward-rotating motor 70, and separates the sheets SH fed from the sheet feeding roller 92 one by one.

A clutch set 160 is provided in a transmission path of a driving force from the motor 70 to the sheet feeding roller 92, and a clutch set 170 is provided in a transmission path of a driving force from the motor 70 to the separation roller 54. The clutch set 160 is an example of a first clutch set, and the clutch set 170 is an example of a second clutch set. FIGS. 17A to 18B show detailed configurations of the clutch sets 160 and 170.

Figure 17A:
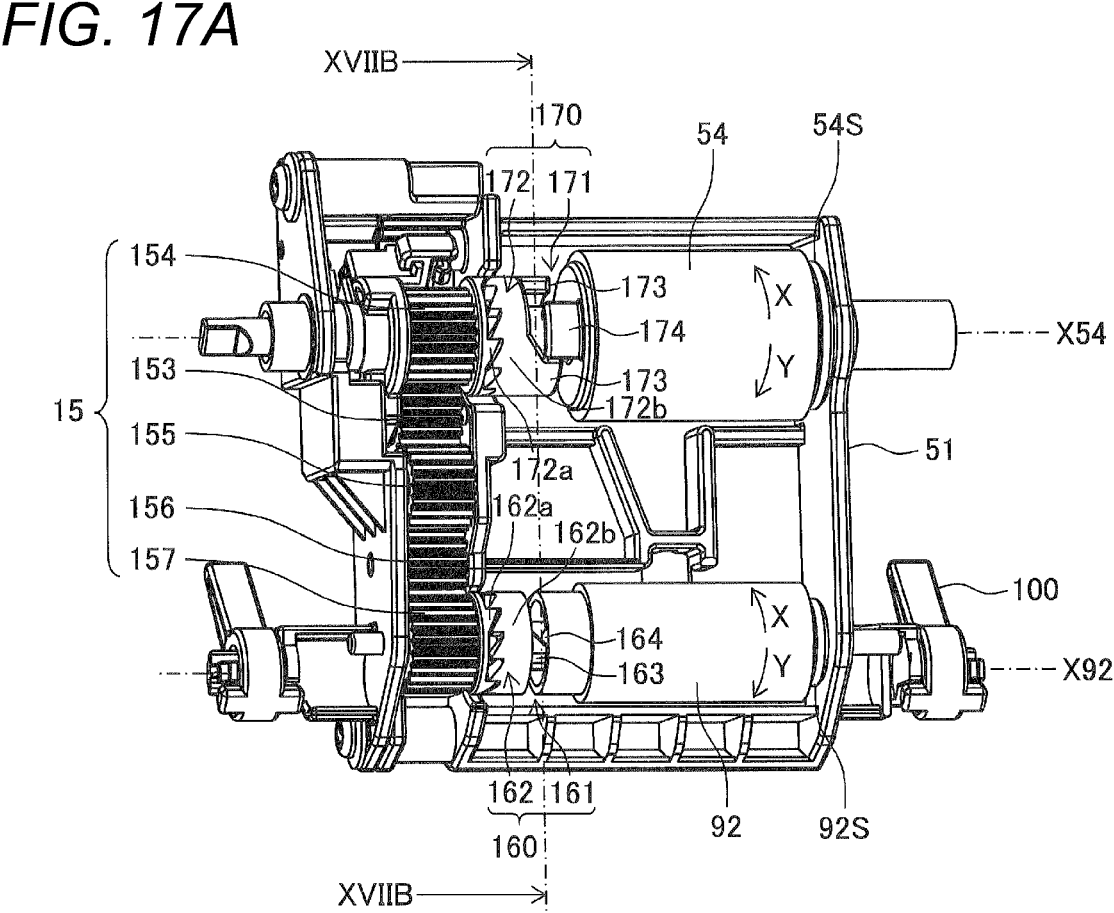
FIGS. 17A and 17B are a partially enlarged view showing configurations of clutch sets together with a gear mechanism and a cross-sectional view taken along a cross section of XVIIB-XVIIB in the partially enlarged view, respectively, in a state where both the sheet feeding roller and the separation roller are driven by the motor.
Figure 17B:
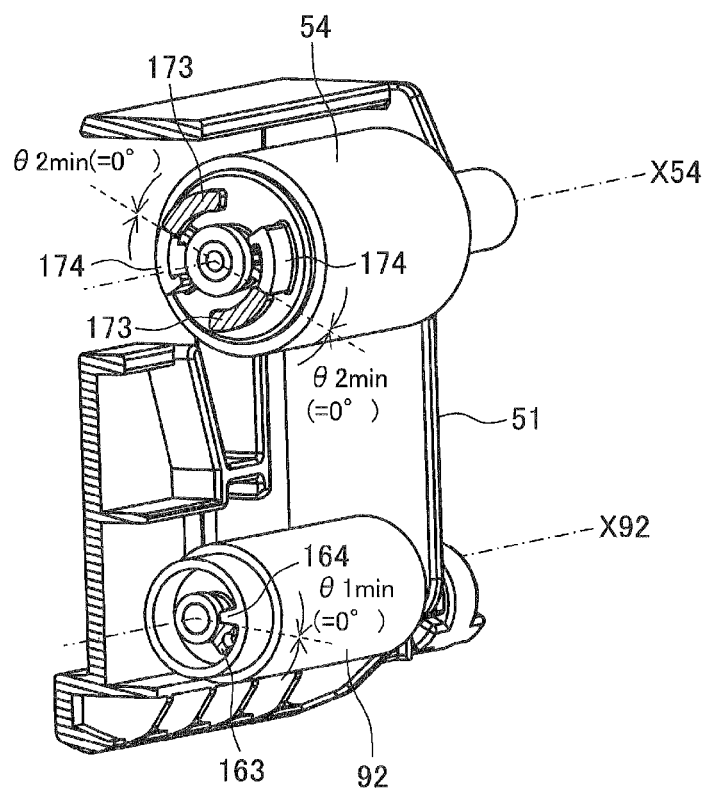
Figure 18A:
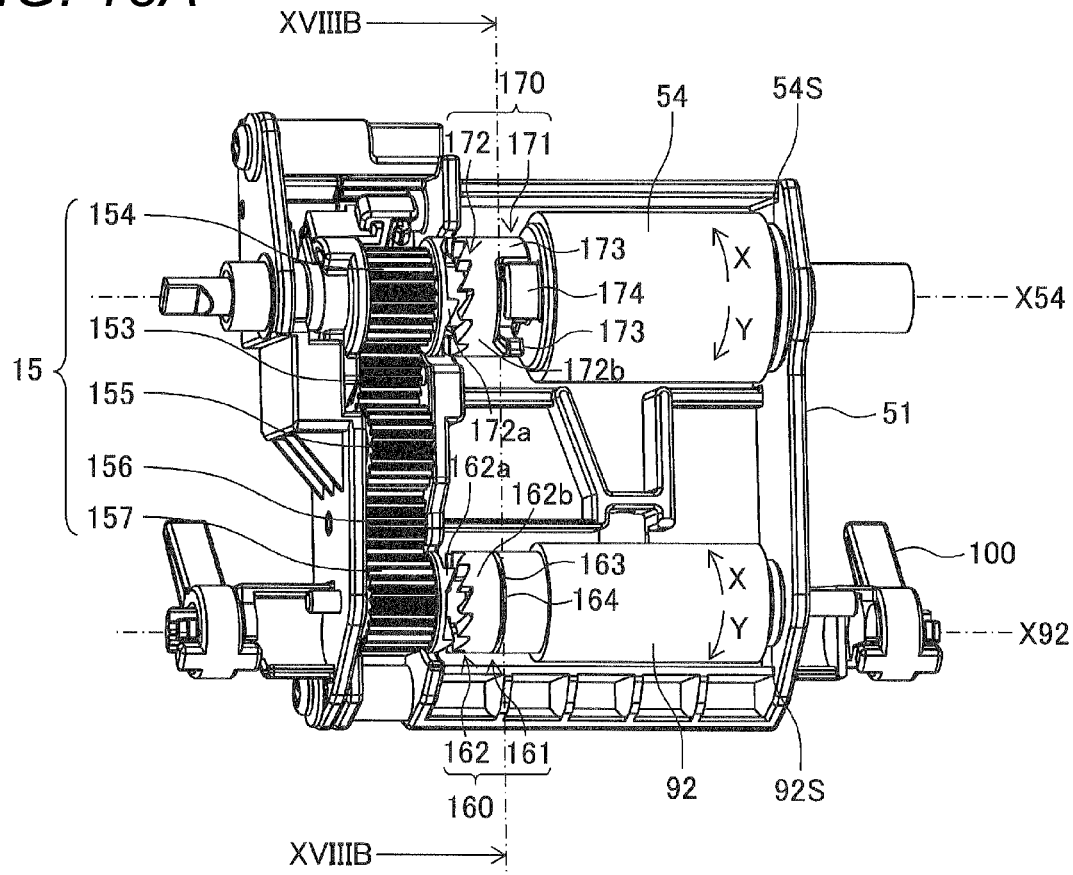
FIGS. 18A and 18B are a partially enlarged view showing the configurations of the clutch sets together with the gear mechanism and the cross-sectional view taken along the cross section of XVIIIB-XVIIIB in the partially enlarged view, respectively, in a state where both the sheet feeding roller and the separation roller are co-rotated by rotation of the first conveyance roller.
Figure 18B:
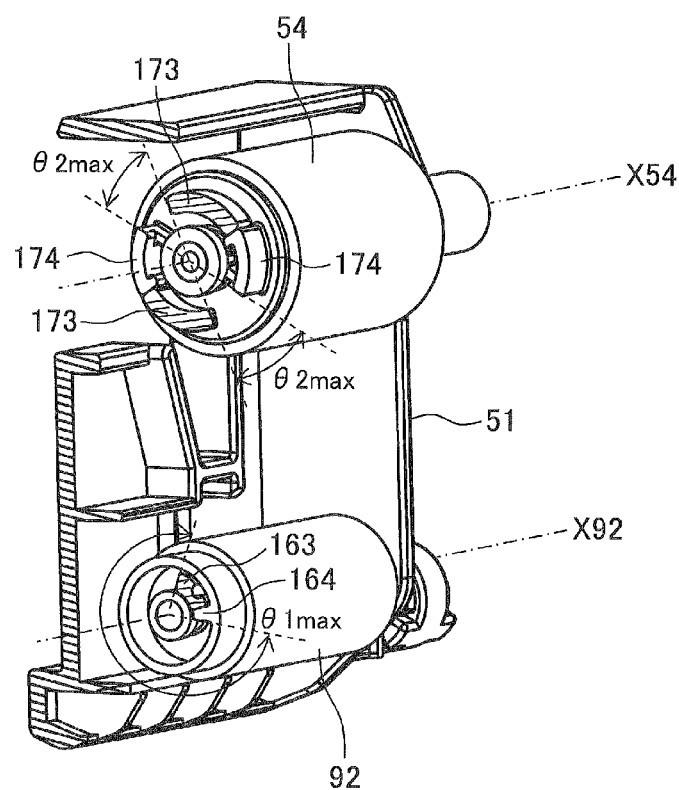

FIG. 17A is a partially enlarged view showing configurations of the clutch sets 160 and 170 together with the gear mechanism 15 in a state where both the sheet feeding roller 92 and the separation roller 54 are driven by the motor 70. FIG. 17B is a cross-sectional view taken along a cross section of XVIIB-XVIIB in FIG. 17A. FIG. 18A is a partially enlarged view showing the configurations of the clutch sets 160 and 170 together with the gear mechanism 15 in a state where both the sheet feeding roller 92 and the separation roller 54 are co-rotated by rotation of the first conveyance roller 44. FIG. 18B is a cross-sectional view taken along a cross section of XVIIIB-XVIIIB in FIG. 18A. FIGS. 17A and 18A show a state where the planetary gear 153 meshes with the intermediate gear 155, and the driving force from the motor 70 is transmitted to the shaft gear 154 and is transmitted to the shaft gear 157 via the planetary gear 153, the intermediate gear 155, and the intermediate gear 156, as shown in FIG. 15A.

Since the conveying speed of the sheet SH by the first conveyance roller 44 is faster than the conveying speeds of the sheet SH by the separation roller 54 and the sheet feeding roller 92 as described above, the separation roller 54 and the sheet feeding roller 92 are rotated while being pulled by the sheet SH conveyed by the first conveyance roller 44 in a state where the sheet SH is conveyed across the first conveyance roller 44, the separation roller 54, and the sheet feeding roller 92. In the present description, such a rotation mode is referred to as "co-rotation" as appropriate.

As shown in FIGS. 17A, 17B, 18A, and 18B, the clutch set 160 includes a two-way clutch 161 and a one-way clutch 162. The two-way clutch 161 can transmit both the driving force from the motor 70 that rotates in the Y direction and the driving force from the motor 70 that rotates in the X direction. The one-way clutch 162 is connected to the two-way clutch 161, does not transmit the rotational driving force in the Y direction from the motor 70, and transmits the rotational driving force in the X direction from the motor 70. The two-way clutch 161 is an example of a first two-way clutch, and the one-way clutch 162 is an example of a first one-way clutch. The two-way clutch 161 includes a protrusion-shaped transmission portion 163 and a protrusion-shaped transmitted portion 164. The transmission portion 163 rotates around the rotation axis X92 by the driving force from the motor 70 that rotates in a reverse direction or in a forward direction. The transmitted portion 164 is rotatable around the rotation axis X92, can abut against the transmission portion 163 in a circumferential direction of the rotation axis X92, and is driven to rotate with a delay less than one revolution of the transmission portion 163. The transmission portion 163 is connected to the one-way clutch 162, and the transmitted portion 164 is connected to the sheet feeding roller 92. The rotation axis X92 is an example of a first axis, the transmission portion 163 is an example of a first transmission portion, and the transmitted portion 164 is an example of a first transmitted portion.

The one-way clutch 162 includes a fixed side clutch 162a and a movable side clutch 162b. The fixed side clutch 162a is connected to the shaft gear 157 and has gear teeth on the sheet feeding roller 92 side. The movable side clutch 162b has gear teeth that mesh with the gear teeth of the fixed side clutch 162a and is biased toward a fixed side clutch 162a side by a biasing member (not shown). As shown in FIG. 17A, when the sheet feeding roller 92 is not co-rotated, the gear teeth of the fixed side clutch 162a and the gear teeth of the movable side clutch 162b mesh with each other, and a driving force of the shaft gear 157 is transmitted to the sheet feeding roller 92. On the other hand, as shown in FIG. 18A, when the sheet feeding roller 92 is co-rotated, the movable side clutch 162b is configured to move in an axial direction of the rotation axis X92 to release the meshing between the gear teeth of the fixed side clutch 162a and the gear teeth of the movable side clutch 162b, so that a driving force of the sheet feeding roller 92 is not transmitted to the shaft gear 157.

The clutch set 170 includes a two-way clutch 171 and a one-way clutch 172. The two-way clutch 171 can transmit both the driving force from the motor 70 that rotates in the Y direction and the driving force from the motor 70 that rotates in the X direction. The one-way clutch 172 is connected to the two-way clutch 171, does not transmit the rotational driving force in the Y direction from the motor 70, and transmits the rotational driving force in the X direction from the motor 70. The two-way clutch 171 is an example of a second two-way clutch, and the one-way clutch 172 is an example of a second one-way clutch. The two-way clutch 171 includes two protrusion-shaped transmission portions 173 and two protrusion-shaped transmitted portions 174. The transmission portions 173 rotate around the rotation axis X54 by the driving force from the motor 70 that rotates in the reverse direction or in the forward direction. The transmitted portions 174 are rotatable around the rotation axis X54, can abut against the transmission portions 173 in a circumferential direction of the rotation axis X54, and are driven to rotate with a delay less than one revolution of the transmission portions 173. The transmission portion 173 is connected to the one-way clutch 172, and the transmitted portion 174 is connected to the separation roller 54. The rotation axis X54 is an example of a second axis, the transmission portion 173 is an example of a second transmission portion, and the transmitted portion 174 is an example of a second transmitted portion.

The one-way clutch 172 includes a fixed side clutch 172a and a movable side clutch 172b. The fixed side clutch 172a is connected to the shaft gear 154 and has gear teeth on a separation roller 54 side. The movable side clutch 172b has gear teeth that mesh with the gear teeth of the fixed side clutch 172a and is biased toward a fixed side clutch 172a side by a biasing member (not shown). As shown in FIG. 17A, when the separation roller 54 is not co-rotated, the gear teeth of the fixed side clutch 172a and the gear teeth of the movable side clutch 172b mesh with each other, and a driving force of the shaft gear 154 is transmitted to the separation roller 54. On the other hand, as shown in FIG. 18A, when the separation roller 54 is co-rotated, the movable side clutch 172b is configured to move in an axial direction of the rotation axis X54 to release the meshing between the gear teeth of the fixed side clutch 172a and the gear teeth of the movable side clutch 172b, so that a driving force of the separation roller 54 is not transmitted to the shaft gear 154.

In the two-way clutch 161 of the clutch set 160, a play angle $\theta 1$, which is a gap angle in a circumferential direction, is formed between the transmission portion 163 and the transmitted portion 164. The play angle $\theta 1$ decreases when the sheet feeding roller 92 is not co-rotated, and becomes a minimum value $\theta 1 min$ (=0°) (hereinafter, referred to as "minimum play angle $\theta 1 min$") as shown in FIG. 17B, so that the transmission portion 163 abuts against one side of the transmitted portion 164 in a circumferential direction. As a result, the driving force of the shaft gear 157 is transmitted to the sheet feeding roller 92. On the other hand, the play angle $\theta 1$ increases when the sheet feeding roller 92 is co-rotated, and becomes a maximum value $\theta 1 max$ (hereinafter, referred to as "maximum play angle $\theta 1 max$") as shown in FIG. 18B, so that the transmission portion 163 abuts against the other side of the transmitted portion 164 in the circumferential direction. As a result, the driving force of the sheet feeding roller 92 is transmitted to the movable side clutch 162b, but since the meshing between the gear teeth of the fixed side clutch 162a and the gear teeth of the movable side clutch 162b is released as described above, the driving force of the sheet feeding roller 92 is not transmitted to the shaft gear 157. The maximum play angle $\theta 1 max$ is an example of a maximum value of a first play angle.

Similarly, in the two-way clutch 171 of the clutch set 170, a play angle $\theta 2$, which is a gap angle in a circumferential direction, is formed between the transmission portion 173 and the transmitted portion 174. The play angle $\theta 2$ decreases when the separation roller 54 is not co-rotated, and becomes a minimum value $\theta 2 min$ (=0°) (hereinafter, referred to as "minimum play angle $\theta 2 min$") as shown in FIG. 17B, so that the transmission portion 173 abuts against one side of the transmitted portion 174 in a circumferential direction. As a result, the driving force of the shaft gear 154 is transmitted to the separation roller 54. On the other hand, the play angle $\theta 2$ increases when the separation roller 54 is co-rotated, and becomes a maximum value $\theta 2 max$ (hereinafter, referred to as "maximum play angle $\theta 2 min$") as shown in FIG. 18B, so that the transmission portion 173 abuts against the other side of the transmitted portion 174 in the circumferential direction. As a result, the driving force of the separation roller 54 is transmitted to the movable side clutch 172b, but since the meshing between the gear teeth of the fixed side clutch 172a and the gear teeth of the movable side clutch 172b is released as described above, the driving force of the separation roller 54 is not transmitted to the shaft gear 154. The maximum play angle $\theta 2 max$ is an example of a maximum value of a second play angle.

As shown in FIG. 18B, the maximum play angle $\theta 1 max$ is larger than the maximum play angle $\theta 2 max$. A deviation between the maximum play angle $\theta 1 max$ and the maximum play angle $\theta 2 max$ is set such that the transmitted portion 164 starts to be rotated by rotational driving of the transmission portion 163 after the transmitted portion 174 starts to be rotated by rotational driving of the transmission portion 173. In other words, the deviation is set such that the sheet feeding roller 92 starts rotating after the separation roller 54 starts rotating. As an example, the maximum play angle $\theta 1 max$ is set to, for example, about 295°, and the maximum play angle $\theta 2 max$ is set to, for example, about 50°.

The sheet conveying sensor 113 detects that the distal end in the conveying direction and the rear end in the conveying direction of the sheet SH conveyed in the ADF 9 have passed the predetermined detection position in the conveyance path P1. If a sheet interval, which is a separation distance between a rear end of a preceding sheet SH and a front end of a succeeding sheet SH, is not sufficient, the sheet conveying sensor 113 may not be able to detect the front end and the rear end of the sheet SH. Therefore, a lower limit value of the sheet interval that can be detected by the sheet conveying sensor 113 is set. The deviation is set such that when the plurality of sheets SH are fed to the sheet feeding roller 92, the sheet interval between the rear end of the preceding sheet SH and the front end of the succeeding sheet SH is equal to or larger than the lower limit value at which both the rear end of the preceding sheet SH and the front end of the succeeding sheet SH are detectable by the sheet conveying sensor 113. The lower limit value for sheet detection is set to a different value in accordance with a size of the sheet SH, and is set to be a value larger than a lower limit value when the deviation is the largest value, for example, a lower limit value when a sheet size is the smallest A6 size in a target range. The sheet conveying sensor 113 is an example of a sensor, and the lower limit value is an example of a first threshold.

The controller 110 has a function of detecting presence or absence of skew movement of the sheet SH based on an image generated by the FB unit 5, and correcting inclination of the image by a software processing when the skew movement of the sheet SH is detected. If the sheet interval, which is the separation distance between the rear end of the preceding sheet SH and the front end of the succeeding sheet SH, is not sufficient, the rear end of the preceding sheet SH and the front end of the succeeding sheet SH may overlap each other, and inclination of the sheet SH may not be determined based on an edge of an image read by the FB unit 5. Therefore, a lower limit value of the sheet interval is set so that the skew movement can be determined. The deviation is set such that when the plurality of sheets SH are fed to the sheet feeding roller 92, the sheet interval between the rear end of the preceding sheet SH and the front end of the succeeding sheet SH is equal to or larger than the lower limit value at which the skew movement of the sheet is determinable. The lower limit value for skew determination is set to a different value in accordance with a size of the sheet SH, and is set to be a value larger than a lower limit value when the deviation is the largest value, for example, a lower limit value when a sheet size is the largest A3 size in a target range. The lower limit value is an example of a second threshold.

Effects of Embodiment

Effects obtained by the multifunction device 1 of the present embodiment described above will be described with reference to FIGS. 20A to 20D while comparing with a comparative example shown in FIGS. 19A to 19D. FIGS. 19A to 20D are illustrative diagrams conceptually showing behavior when, for example, two sheets SH1 and SH2 are fed to the sheet feeding roller 92. FIGS. 19A to 19D show behavior in the comparative example when the maximum play angle $\theta 1$max and the maximum play angle $\theta 2$max are substantially the same. FIGS. 20A to 20D show behavior in the present embodiment.

In the present embodiment, the clutch sets 160 and 170 are respectively provided in the transmission path of the driving force from the motor 70 to the sheet feeding roller 92 and the transmission path of the driving force from the motor 70 to the separation roller 54. The clutch set 160 includes the one-way clutch 162, and the clutch set 170 includes the one-way clutch 172. As described above, the conveying speed of the first conveyance roller 44 on the downstream side is set to be faster than those of the separation roller 54 and the sheet feeding roller 92 on the upstream side. Therefore, in a state where the sheet SH is conveyed across the first conveyance roller 44, the sheet feeding roller 92, and the separation roller 54, the separation roller 54 and the sheet feeding roller 92 are pulled by the sheet SH conveyed by rotation of the first conveyance roller 44 and co-rotated. Since the one-way clutch 162 is provided in the clutch set 160 and the one-way clutch 172 is provided in the clutch set 170, even when the separation roller 54 and the sheet feeding roller 92 are co-rotated, the sheet feeding roller 92 does not apply a force in a direction opposite to the driving force to the shaft gear 157 and the separation roller 54 does not apply a force in a direction opposite to the driving force to the shaft gear 154. Therefore, smooth conveyance can be performed without slippage between roller surfaces of the sheet feeding roller 92 and the separation roller 54 and the sheet SH.

Figure 19A:
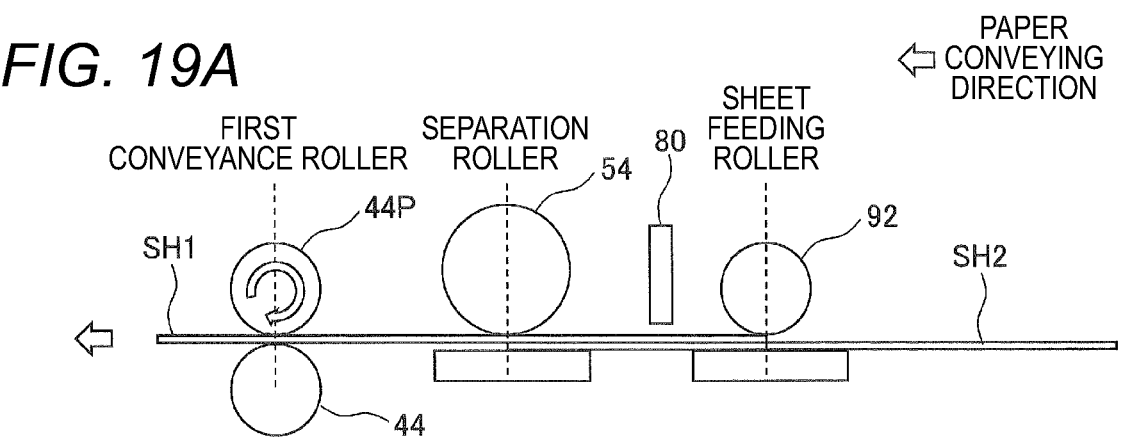
FIGS. 19A to 19D are illustrative diagrams conceptually showing behavior when two sheets are fed to the sheet feeding roller in a comparative example when a maximum value of a play angle on a sheet feeding roller side and a maximum value of a play angle on a separation roller side are substantially the same.

For example, when the two sheets SH1 and SH2 are fed from an upstream side of the sheet feeding roller 92 so as to abut against the stopper 80 and conveyance is started, as shown in FIG. 19A, while the preceding sheet SH1 is conveyed across the first conveyance roller 44, the separation roller 54, and the sheet feeding roller 92, each of the separation roller 54 and the sheet feeding roller 92 is in a co-rotation state by conveyance of the first conveyance roller 44. The state shown in FIGS. 18A and 18B is the co-rotation state. In the state, in the two-way clutch 161 provided in the clutch set 160 of the sheet feeding roller 92, the play angle $\theta 1$ set between the transmission portion 163 and the transmitted portion 164 is increased to the maximum play angle $\theta 1$max due to the speed difference between the two-way clutch 161 and the first conveyance roller 44. Further, in the two-way clutch 171 provided in the clutch set 170 of the separation roller 54, the play angle $\theta 2$ set between the transmission portion 173 and the transmitted portion 174 is increased to the maximum play angle $\theta 2$max. Although the distal end of the succeeding sheet SH2 may stop at a position of the stopper 80, the distal end of the succeeding sheet SH2 may be pulled by the preceding sheet SH1 and may move until the distal end reaches a nip position by the separation roller 54 as shown in FIG. 19A. In the latter case, the distal end of the sheet SH2 is started from a position of the separation roller 54, and the sheet interval between the sheets SH1 and SH2 is likely to be reduced. The sheet SH1 is an example of a first sheet, and the sheet SH2 is an example of a second sheet.

Figure 19B:
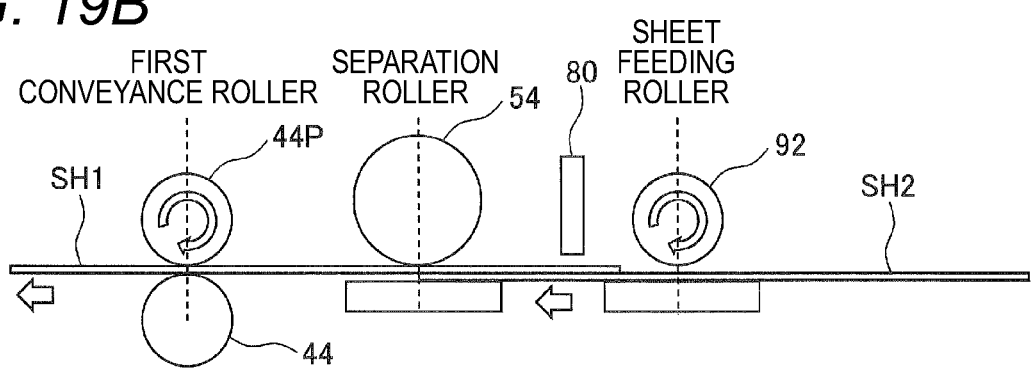

Thereafter, as shown in FIG. 19B, when the rear end of the sheet SH1 passes through the sheet feeding roller 92, co-rotation of the sheet feeding roller 92 ends and rotation is stopped. As a result, the play angle $\theta 1$ between the transmission portion 163 to which the driving force from the motor 70 is input and the transmitted portion 164 facing the transmission portion 163 in a circumferential direction is decreased. As in the comparative example, when the maximum play angle $\theta 1$max of the two-way clutch 161 of the sheet feeding roller 92 and the maximum play angle $\theta 2$max of the two-way clutch 171 of the separation roller 54 are set to substantially the same value, the decreased play angle $\theta 1$ becomes 0° relatively early. Accordingly, the transmission portion 163 and the transmitted portion 164 abut against each other, the driving force is transmitted to the sheet feeding roller 92, and the sheet feeding roller 92 starts conveying the exposed succeeding sheet SH2 after the rear end of the preceding sheet SH1 has passed through the sheet feeding roller 92. As a result, a conveying start timing of the sheet feeding roller 92 becomes relatively early.

Figure 19C:
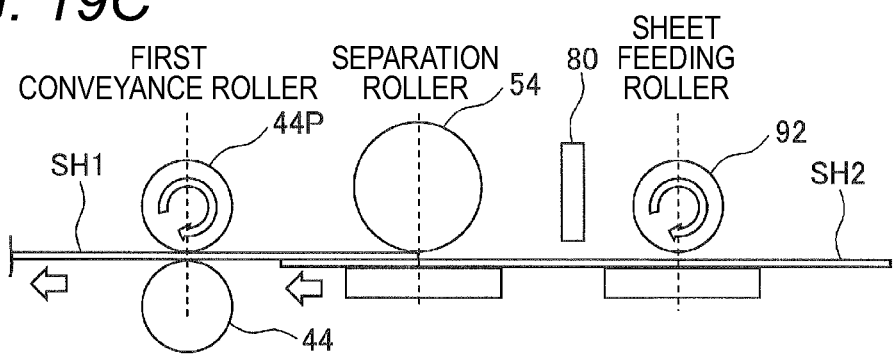

Thereafter, as shown in FIG. 19C, when the rear end of the sheet SH1 passes through the separation roller 54, co-rotation of the separation roller 54 ends and rotation is stopped. As a result, the play angle $\theta 2$ between the transmission portion 173 to which the driving force from the motor 70 is input and the transmitted portion 174 facing the transmission portion 173 in a circumferential direction is decreased. When the decreased play angle $\theta 2$ becomes 0°, the transmission portions 173 and the transmitted portions 174 abut against each other and the driving force is transmitted to the separation roller 54, and the separation roller 54 starts conveying the exposed succeeding sheet SH2 after the rear end of the preceding sheet SH1 has passed through the separation roller 54. A state immediately after the separation roller 54 starts the conveyance is the state shown in FIGS. 17A and 17B described above.

Figure 19D:
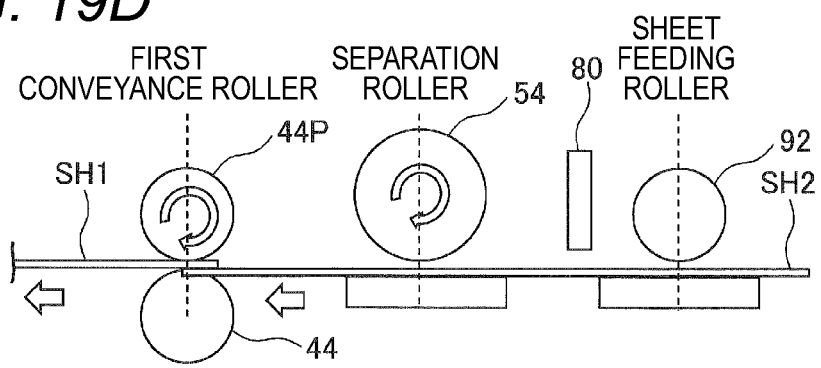

Thereafter, as shown in FIG. 19D, the preceding sheet SH1 is conveyed by the first conveyance roller 44, and the succeeding sheet SH2 is conveyed by the separation roller 54. Since the sheet SH2 is conveyed across the separation roller 54 and the sheet feeding roller 92, the sheet feeding roller 92 is in a co-rotation state by the conveyance of the separation roller 54.

Because of the behavior as described above, in the present comparative example, as shown in FIG. 19B, the sheet feeding roller 92 may start conveying the succeeding sheet SH2 in a state where the rear end of the preceding sheet SH1 has not passed through the separation roller 54. In this case, a nip load from the separation roller 54 is applied to the succeeding sheet SH2 fed by the sheet feeding roller 92 in a state where the succeeding sheet SH2 overlaps the preceding sheet SH1. Accordingly, when a rigidity of the succeeding sheet SH2 is low, for example, when the succeeding sheet SH2 is a thin sheet, the distal end of the sheet SH2 may be wrinkled. Further, even when the sheet SH2 has a high rigidity and is not wrinkled, the interval between the preceding sheet SH1 and the succeeding sheet SH2 cannot be sufficiently made. As shown in FIG. 19D, the sheets SH1 and SH2 may overlap each other on the first conveyance roller 44, resulting in multi-feed. In this way, in the comparative example, there is a concern that conveyance abnormality such as occurrence of a wrinkle or occurrence of multi-feed may occur.

Therefore, in the present embodiment, as described above, the maximum play angle θ1max set in the two-way clutch 161 of the clutch set 160 that transmits the driving force to the sheet feeding roller 92 is made larger than the maximum play angle θ2max set in the two-way clutch 171 of the clutch set 170 that transmits the driving force to the separation roller 54. Accordingly, compared with a case where the two play angles are set to substantially the same value as in at least the comparative example, it is possible to delay a conveying start timing of the succeeding sheet SH2 by the sheet feeding roller 92.

Figure 20A:
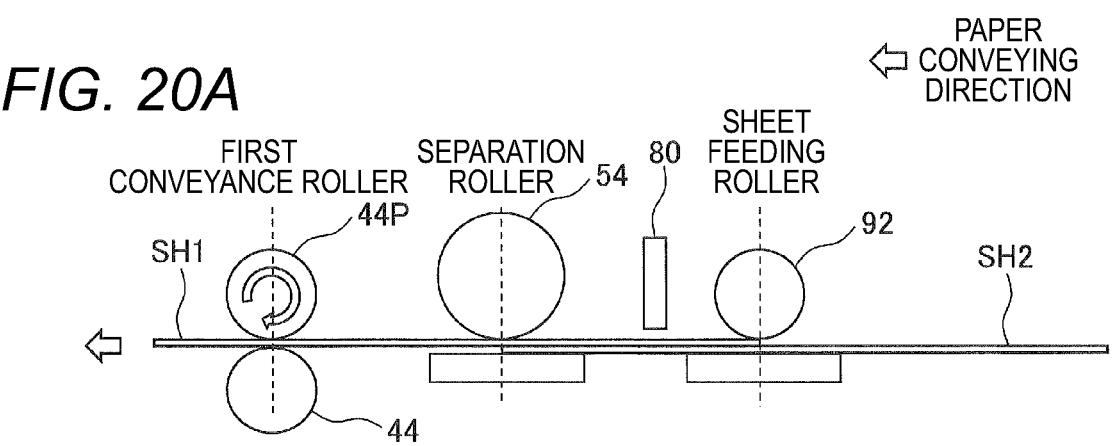
FIGS. 20A to 20D are illustrative diagrams conceptually showing behavior when the two sheets are fed to the sheet feeding roller in the present embodiment.

Specifically, as shown in FIG. 20A, while the preceding sheet SH1 is conveyed across the first conveyance roller 44, the separation roller 54, and the sheet feeding roller 92, the separation roller 54 and the sheet feeding roller 92 are in a co-rotation state, the play angle θ1 of the two-way clutch 161 of the sheet feeding roller 92 is increased to the maximum play angle θ1max, and the play angle θ2 of the two-way clutch 171 of the separation roller 54 is increased to the maximum play angle θ2max.

Figure 20B:
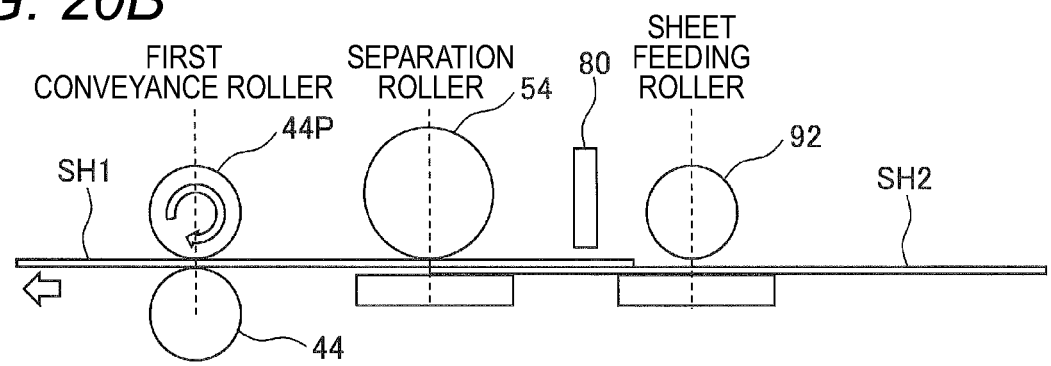

Thereafter, as shown in FIG. 20B, when the rear end of the sheet SH1 passes through the sheet feeding roller 92, the play angle θ1 of the two-way clutch 161 of the sheet feeding roller 92 is decreased. However, since the maximum play angle θ1max is set to be large, conveyance by the sheet feeding roller 92 is not immediately started.

Figure 20C:
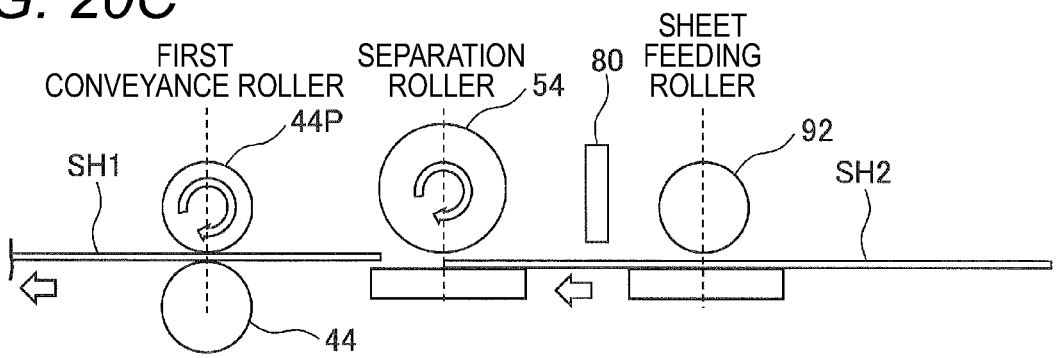

Thereafter, as shown in FIG. 20C, even when the rear end of the sheet SH1 passes through the separation roller 54, since the maximum play angle θ1max is set to be large, the conveyance by the sheet feeding roller 92 is not yet started. On the other hand, the co-rotation of the separation roller 54 ends and the rotation is stopped. As a result, the play angle θ2 of the two-way clutch 171 of the separation roller 54 is decreased. When the play angle θ2 of the separation roller 54 becomes 0° before the play angle θ1 of the sheet feeding roller 92 becomes 0°, the transmission portions 173 and the transmitted portions 174 abut against each other and the driving force is transmitted to the separation roller 54, and the separation roller 54 starts conveying the distal end of the exposed succeeding sheet SH2 after the rear end of the preceding sheet SH1 has passed through the separation roller 54.

Figure 20D:
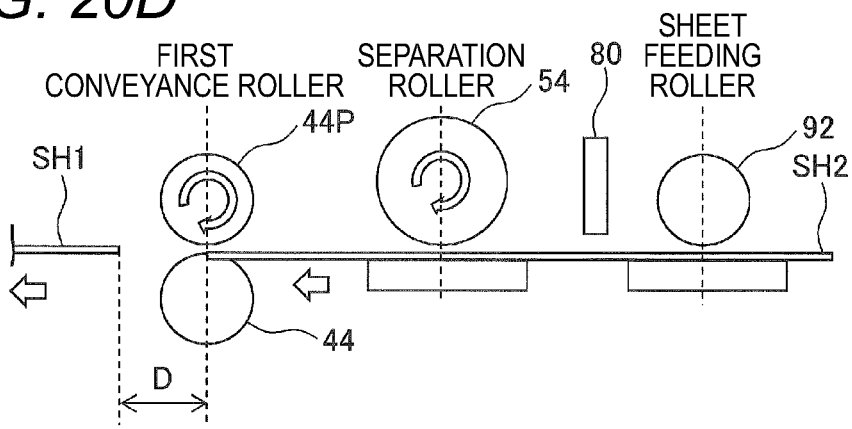

Thereafter, as shown in FIG. 20D, the preceding sheet SH1 is conveyed by the first conveyance roller 44, and the succeeding sheet SH2 is conveyed by the separation roller 54. Since the conveying speed of the first conveyance roller 44 is faster than that of the separation roller 54, the interval between the rear end of the sheet SH1 and the distal end of the sheet SH2 is increased, and a sufficient interval D is secured when the distal end of the sheet SH2 reaches the first conveyance roller 44. As a result, it is possible to reduce occurrence of the multi-feed due to a shortage of the interval between the preceding sheet SH1 and the succeeding sheet SH2 as described above. Further, as shown in FIG. 20C, since it is possible to start conveyance by the separation roller 54 before conveyance by the sheet feeding roller 92 is started, it is possible to reduce occurrence of the wrinkle at the distal end of the sheet SH2 as described above. In this way, it is possible to reduce the occurrence of the conveyance abnormality due to the occurrence of the wrinkle, the occurrence of the multi-feed, or the like.

Particularly, in the present embodiment, the sheet feeding roller 92, the separation roller 54, and the first conveyance roller 44 are rotated by the driving force transmitted from common single motor 70. If the sheet feeding roller 92, the separation roller 54, and the first conveyance roller 44 are driven by separate motors, even when the play angle θ1 of the sheet feeding roller 92 becomes 0° after the rear end of the preceding sheet SH1 has passed through the sheet feeding roller 92, the motor of the sheet feeding roller 92 is not driven for a while, so that a conveying start timing of the sheet feeding roller 92 can be delayed, and the occurrence of the conveyance abnormality can be reduced. However, since a plurality of motors are required, an increase in a size, a weight, and a cost of the multifunction device 1 is caused.

In the present embodiment, the sheet feeding roller 92, the separation roller 54, and the first conveyance roller 44 are rotated by the driving force transmitted from one common motor 70. Further, by adopting the above-described clutch configuration, it is possible to delay the conveying start timing of the sheet feeding roller 92 with respect to the separation roller 54, and to reduce the occurrence of the conveyance abnormality. Accordingly, it is possible to reduce the size and the weight of the multifunction device 1 and reduce the cost as compared with the case where the plurality of motors are used as described above.

Particularly, in the present embodiment, the sheet feeding roller 92, the separation roller 54, the first conveyance roller 44, and the like sequentially convey the sheets SH as described above, so that the sheets SH are fed to the FB unit 5 positioned on a downstream side along the conveyance path P1, and each sheet SH is read by the FB unit 5 to generate image data based on an image of the sheet SH. According to the present embodiment, in the configuration of the multifunction device 1 including the ADF 9 that is a mechanism for sequentially feeding such sheets SH to the FB unit 5, it is possible to obtain an effect of reducing the conveyance abnormality.

Particularly, in the present embodiment, when the maximum play angle θ1max on the sheet feeding roller 92 side is made larger than the maximum play angle θ2max on the separation roller 54 side, the deviation thereof is set such that the sheet feeding roller 92 starts rotating by driving force transmission of the two-way clutch 161 after the separation roller 54 starts rotating by driving force transmission of the two-way clutch 171. Accordingly, since the conveying start timing of the sheet feeding roller 92 can be reliably delayed, the occurrence of the conveyance abnormality can be reduced more reliably. Further, unlike a case where a distance between the first conveyance roller 44 and the separation roller 54 is increased in order to prevent the multi-feed, the increase in the size of the entire multifunction device 1 is not caused.

Particularly, in the present embodiment, the sheet conveying sensor 113 detects the front end and the rear end of the conveyed sheet SH. At that time, when the deviation between the maximum play angle θ1max and the maximum play angle θ2max is relatively small, a time until the co-rotation of the sheet feeding roller 92 ends and the play angle θ1 between the transmission portion 163 and the transmitted portion 164 becomes 0° is shortened. As a result, the gap between the two sheets continuously and sequentially conveyed becomes small. Therefore, depending on a size of the sheet SH, the sheet conveying sensor 113 cannot detect the gap between the two sheets sequentially conveyed while being separated from each other, and may erroneously detect that the sheet SH is a single long sheet. Therefore, in the present embodiment, regarding the separation distance between the rear end of the preceding sheet SH1 and the front end of the succeeding sheet SH2, the lower limit value that can be detected by the sheet conveying sensor 113 is determined in accordance with a size of the sheet SH, and the deviation between the maximum play angle θ1max and the maximum play angle θ2max is set such that the separation distance during conveyance is equal to or larger than the lower limit value. Accordingly, the erroneous detection by the sheet conveying sensor 113 can be reduced.

Particularly, in the present embodiment, when the plurality of sheets SH are sequentially conveyed while being separated from each other as described above, in a case where the separation distance between the sheets is not sufficient, the controller 110 may not be able to determine the inclination of the image based on the image data generated by the FB unit 5. Therefore, in the present embodiment, regarding the separation distance between the rear end of the preceding sheet SH1 and the front end of the succeeding sheet SH2, the lower limit value at which the inclination of the image can be determined based on the image data is determined in accordance with a size of the sheet SH, and the deviation between the maximum play angle θ1max and the maximum play angle θ2max is set so as to be equal to or larger than the lower limit value. Accordingly, even when the sheet SH is skewed, the inclination of the image data generated by the FB unit 5 can be detected.

The present disclosure is not limited to the above-described embodiment and various modifications can be made within the scope not deviating from the gist and technical idea thereof. These modifications are also included in the technical scope.

That is, in the above description, the conveying speed of the sheet SH by the separation roller 54 is faster than the conveying speed of the sheet SH by the sheet feeding roller 92, but the present disclosure is not limited thereto. For example, the conveying speed of the separation roller 54 and the conveying speed of the sheet feeding roller 92 may be substantially the same.

In the above description, the swing of the holder 51 is also implemented using the driving force from the motor 70, but the present disclosure is not limited thereto. That is, the holder 51 may be swung using a driving force from a driving source different from the motor 70.

In the above description, a case where the present disclosure is applied to the document sheet feeding mechanism in the ADF 9 when the document is inserted into the ADF 9 by the user has been described as an example, but the present disclosure is not limited thereto. That is, the present disclosure may be applied to a manual sheet feeding mechanism when the user inserts a recording sheet from a manual sheet feeding port separately provided in the main body unit 2. Also in this case, the same effects as described above are obtained.

Further, the above description has been made by taking the multifunction device 1 as an example of the image processing apparatus, but the present disclosure is not limited thereto. That is, as another example of the image processing apparatus, the present disclosure may be applied to a reading apparatus including only a portion corresponding to the reader 3 without including a portion corresponding to the image forming unit 4. Also in this case, the same effects as described above are obtained.

In addition to those described above, the methods according to the above-described embodiment and the modifications may be used in combination as appropriate.

Though not specifically exemplified, the present disclosure should be put into practice with various changes made in a range not departing from its gist.

What is claimed is:

1. An image processing apparatus comprising:
    a motor rotatable in a first rotation direction or a second rotation direction opposite to the first rotation direction to generate a driving force corresponding to the respective rotation directions;
    a sheet feeding roller configured to be rotated around a first axis by the driving force transmitted from the motor to feed a sheet in a conveying direction;
    a separation roller positioned downstream of the sheet feeding roller in the conveying direction, the separation roller being configured to be rotated around a second axis by the driving force transmitted from the motor to separate the sheet fed from the sheet feeding roller one by one;
    a conveyance roller positioned downstream of the separation roller in the conveying direction, the conveyance roller being configured to be rotated by the driving force transmitted from the motor to convey the sheet at a conveying speed faster than conveying speeds of the sheet feeding roller and the separation roller;
    a first clutch set provided in a transmission path of the driving force transmitted from the motor to the sheet feeding roller, the first clutch set including:
        a first one-way clutch configured not to transmit a first driving force transmitted from the motor rotating in the first rotation direction and configured to transmit a second driving force transmitted from the motor rotating in the second rotation direction, and
        a first two-way clutch connected to the first one-way clutch, the first two-way clutch including:
            a first transmission portion configured to be rotated around the first axis by the first driving force or the second driving force, and
            a first transmitted portion rotatable around the first axis and abuttable against the first transmission portion in a circumferential direction of the first axis, the first transmitted portion being configured to be rotated by the first transmission portion with a delay less than one revolution of the first transmission portion; and
    a second clutch set provided in a transmission path of the driving force transmitted from the motor to the separation roller, the second clutch set including:
        a second one-way clutch configured not to transmit the first driving force from the motor and configured to transmit the second driving force from the motor, and
        a second two-way clutch connected to the second one-way clutch, the second two-way clutch including:
            a second transmission portion configured to be rotated around the second axis by the first driving force or the second driving force, and
            a second transmitted portion rotatable around the second axis and abuttable against the second transmission portion in a circumferential direction of the second axis, the second transmitted portion being configured to be rotated by the second transmission portion with a delay less than one revolution of the second transmission portion,
    wherein a maximum value of a first play angle set between the first transmission portion and the first transmitted portion in the first two-way clutch is larger than a maximum value of a second play angle set between the second transmission portion and the second transmitted portion in the second two-way clutch.

2. The image processing apparatus according to claim 1, wherein the sheet feeding roller, the separation roller, and the conveyance roller are configured to be rotated by the driving force transmitted from a common single motor identical to the motor.

3. The image processing apparatus according to claim 1, further comprising:
an image reader configured to read a document serving as the sheet to generate image data based on an image of the document,
wherein the sheet feeding roller, the separation roller, and the conveyance roller are configured to convey the sheet to the image reader along a predetermined conveyance path.

4. The image processing apparatus according to claim 1, wherein a deviation between the maximum value of the first play angle in the first two-way clutch and the maximum value of the second play angle in the second two-way clutch is set such that the first transmitted portion starts to be rotated by rotation of the first transmission portion after the second transmitted portion starts to be rotated by rotation of the second transmission portion.

5. The image processing apparatus according to claim 4, further comprising:
a sensor configured to detect the conveyed sheet,
wherein the deviation is set such that, when a plurality of sheets including a first sheet and a second sheet subsequently followed by the first sheet are fed to the sheet feeding roller, a separation distance between a rear end of the first sheet and a front end of the second sheet is larger than a first threshold, the first threshold being a lower limit value of the separation distance at which both the rear end of the first sheet and the front end of the second sheet are detectable by the sensor, and
wherein the first threshold is set to be variable in accordance with a size of the sheet.

6. The image processing apparatus according to claim 4, wherein the deviation is set such that, when a plurality of sheets including a first sheet and a second sheet subsequently followed by the first sheet are fed to the sheet feeding roller, the separation distance is larger than a second threshold, the second threshold being a lower limit value of the separation distance at which skew movement of at least one of the first sheet and the second sheet is determinable, and
wherein the second threshold is set to be variable in accordance with a size of the sheet.

\* \* \* \* \*